(12) United States Patent
Sinclair et al.

(10) Patent No.: US 7,499,686 B2
(45) Date of Patent: Mar. 3, 2009

(54) METHOD AND APPARATUS FOR MULTI-SENSORY SPEECH ENHANCEMENT ON A MOBILE DEVICE

(75) Inventors: Michael J. Sinclair, Kirkland, WA (US); Xuedong David Huang, Bellevue, WA (US); Zhengyou Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 537 days.

(21) Appl. No.: 10/785,768

(22) Filed: Feb. 24, 2004

(65) Prior Publication Data

US 2005/0185813 A1  Aug. 25, 2005

(51) Int. Cl.
*H04B 1/10* (2006.01)
(52) U.S. Cl. ............... 455/223; 455/114.2; 455/283; 455/570; 379/392.01; 381/375; 704/260
(58) Field of Classification Search ............... 455/90, 455/568, 569, 556, 573, 575, 63.1, 67.13, 455/144, 222, 283, 296, 310, 501, 570, 114.2, 455/223; 379/428, 433, 338.01, 390.01, 379/388, 391, 392.01; 370/286, 287; 381/71.1–71.14, 381/104, 107, 370, 374, 375, 380; 704/226–228, 704/231–233, 260
See application file for complete search history.

(56) References Cited

U.S. PATENT DOCUMENTS

| | | | |
|---|---|---|---|
| 3,383,466 A | 5/1968 | Hilix et al. ............... 179/1 |
| 3,746,789 A | 7/1973 | Alcivar .................. 179/1 |
| 3,787,641 A | 1/1974 | Santori ................. 179/107 |
| 4,382,164 A | 5/1983 | May, Jr. ................. 704/233 |
| 4,769,845 A | 9/1988 | Nakamura ............... 74/231 |
| 5,054,079 A | 10/1991 | Frielingsdorf et al. ....... 381/151 |
| 5,151,944 A | 9/1992 | Yamamura ............... 381/151 |
| 5,197,091 A | 3/1993 | Takagi et al. ........... 379/433.12 |

(Continued)

FOREIGN PATENT DOCUMENTS

DE  199 17 169  11/2000

(Continued)

OTHER PUBLICATIONS

Australian Search Report and Written Opinion for Foreign Application No. SG 200500289-4 filed Jan. 18, 2005.

(Continued)

*Primary Examiner*—Nhan T Le
(74) *Attorney, Agent, or Firm*—Theodore M. Magee; Westman, Champlin & Kelly, P.A.

(57) ABSTRACT

A mobile device is provided that includes a digit input that can be manipulated by a user's fingers or thumb, an air conduction microphone and an alternative sensor that provides an alternative sensor signal indicative of speech. Under some embodiments, the mobile device also includes a proximity sensor that provides a proximity signal indicative of the distance from the mobile device to an object. Under some embodiments, the signal from the air conduction microphone, the alternative sensor signal, and the proximity signal are used to form an estimate of a clean speech value. In further embodiments, a sound is produced through a speaker in the mobile device based on the amount of noise in the clean speech value. In other embodiments, the sound produced through the speaker is based on the proximity sensor signal.

25 Claims, 13 Drawing Sheets

U.S. PATENT DOCUMENTS

| | | | |
|---|---|---|---|
| 5,295,193 A | 3/1994 | Ono | 381/151 |
| 5,404,577 A | 4/1995 | Zuckerman et al. | 455/66 |
| 5,446,789 A | 8/1995 | Loy et al. | |
| H1497 H | 10/1995 | Marshall | 704/276 |
| 5,555,449 A | 9/1996 | Kim | 379/433.03 |
| 5,590,241 A | 12/1996 | Park et al. | 704/227 |
| 5,647,834 A | 7/1997 | Ron | 600/23 |
| 5,692,059 A | 11/1997 | Kruger | 381/151 |
| 5,701,390 A | 12/1997 | Griffin et al. | 704/206 |
| 5,757,934 A | 5/1998 | Yokoi | 381/68.3 |
| 5,812,970 A | 9/1998 | Chan et al. | 704/226 |
| 5,828,768 A | 10/1998 | Eatwell et al. | 381/333 |
| 5,873,728 A | 2/1999 | Jeong | 434/185 |
| 5,933,506 A | 8/1999 | Aoki et al. | 381/151 |
| 5,943,627 A | 8/1999 | Kim et al. | 379/426 |
| 5,983,073 A | 11/1999 | Ditzik | 455/11.1 |
| 5,983,186 A | 11/1999 | Miyazawa et al. | 704/275 |
| 6,006,175 A | 12/1999 | Holzrichter | 704/208 |
| 6,028,556 A | 2/2000 | Shiraki | 343/702 |
| 6,052,464 A | 4/2000 | Harris et al. | 379/433 |
| 6,052,567 A | 4/2000 | Ito et al. | 455/90 |
| 6,091,972 A | 7/2000 | Ogasawara | 455/575.7 |
| 6,094,492 A | 7/2000 | Boesen | 381/312 |
| 6,125,284 A | 9/2000 | Moore et al. | 455/557 |
| 6,137,883 A | 10/2000 | Kaschke et al. | 379/433.07 |
| 6,151,397 A | 11/2000 | Jackson et al. | 381/71.4 |
| 6,175,633 B1 | 1/2001 | Morrill et al. | 381/71.6 |
| 6,243,596 B1 | 6/2001 | Kikinis | 429/8 |
| 6,266,422 B1 | 7/2001 | Ikeda | 381/71.11 |
| 6,292,674 B1* | 9/2001 | Davis | 455/550.1 |
| 6,308,062 B1 | 10/2001 | Chien et al. | 455/420 |
| 6,339,706 B1 | 1/2002 | Tillgren et al. | 455/419 |
| 6,343,269 B1 | 1/2002 | Harada et al. | 704/243 |
| 6,377,919 B1 | 4/2002 | Burnett et al. | 704/267 |
| 6,389,391 B1* | 5/2002 | Terauchi | 704/233 |
| 6,408,081 B1 | 6/2002 | Boesen | 381/312 |
| 6,411,933 B1 | 6/2002 | Maes et al. | 704/273 |
| 6,434,239 B1 | 8/2002 | DeLuca | 381/71.2 |
| 6,542,721 B2 | 4/2003 | Boesen | 455/90 |
| 6,560,468 B1 | 5/2003 | Boesen | 455/568 |
| 6,590,651 B1 | 7/2003 | Bambot et al. | 356/338 |
| 6,594,629 B1 | 7/2003 | Basu et al. | 704/251 |
| 6,664,713 B2 | 12/2003 | Boesen | 310/328 |
| 6,675,027 B1 | 1/2004 | Huang | 455/575 |
| 6,707,921 B2 | 3/2004 | Moore | 381/327 |
| 6,717,991 B1 | 4/2004 | Gustafsson et al. | 375/285 |
| 6,738,485 B1 | 5/2004 | Boesen | 381/312 |
| 6,754,358 B1* | 6/2004 | Boesen et al. | 381/326 |
| 6,760,600 B2 | 7/2004 | Nickum | 455/557 |
| 6,959,276 B2 | 10/2005 | Droppo et al. | 704/226 |
| 7,054,423 B2 | 5/2006 | Nebiker et al. | 379/201.01 |
| 7,110,944 B2 | 9/2006 | Balan et al. | 704/226 |
| 7,117,148 B2 | 10/2006 | Droppo et al. | 704/228 |
| 7,181,390 B2 | 2/2007 | Droppo et al. | 704/226 |
| 7,190,797 B1* | 3/2007 | Johnston et al. | 381/74 |
| 2001/0027121 A1 | 10/2001 | Boesen | 455/556 |
| 2001/0039195 A1 | 11/2001 | Nickum | 455/557 |
| 2001/0044318 A1* | 11/2001 | Mantyjarvi et al. | 455/550 |
| 2002/0057810 A1 | 5/2002 | Boesen | |
| 2002/0068537 A1* | 6/2002 | Shim et al. | 455/177.1 |
| 2002/0075306 A1 | 6/2002 | Thompson et al. | |
| 2002/0114472 A1 | 8/2002 | Lee et al. | 381/71.12 |
| 2002/0118852 A1 | 8/2002 | Boesen | 381/328 |
| 2002/0173953 A1 | 11/2002 | Frey et al. | 704/226 |
| 2002/0181669 A1 | 12/2002 | Takatori et al. | |
| 2002/0196955 A1 | 12/2002 | Boesen | |
| 2002/0198021 A1 | 12/2002 | Boesen | 455/556 |
| 2003/0061037 A1 | 3/2003 | Droppo et al. | 704/226 |
| 2003/0083112 A1 | 5/2003 | Fukuda | 455/568 |
| 2003/0097254 A1 | 5/2003 | Holzrichter et al. | 704/201 |
| 2003/0125081 A1 | 7/2003 | Boesen | 455/556 |
| 2003/0144844 A1 | 7/2003 | Colmenarez et al. | 704/273 |
| 2003/0179888 A1 | 9/2003 | Burnett et al. | 381/71.8 |
| 2004/0028154 A1 | 2/2004 | Yellin et al. | 375/341 |
| 2004/0086137 A1 | 5/2004 | Yu et al. | 381/71.11 |
| 2004/0092297 A1 | 5/2004 | Huang | |
| 2004/0186710 A1 | 9/2004 | Yang | 704/226 |
| 2004/0249633 A1 | 12/2004 | Asseily et al. | 704/200 |
| 2005/0038659 A1 | 2/2005 | Helbing | 704/271 |
| 2005/0114124 A1 | 5/2005 | Liu et al. | |
| 2006/0008256 A1 | 1/2006 | Khedouri et al. | 386/124 |
| 2006/0009156 A1 | 1/2006 | Hayes et al. | 455/63.1 |
| 2006/0072767 A1 | 4/2006 | Zhang et al. | 381/71.6 |
| 2006/0079291 A1 | 4/2006 | Granovetter et al. | 455/563 |

FOREIGN PATENT DOCUMENTS

| | | |
|---|---|---|
| EP | 0 720 338 A2 | 7/1996 |
| EP | 742 678 | 11/1996 |
| EP | 0 854 535 A2 | 7/1998 |
| EP | 0 939 534 A1 | 9/1999 |
| EP | 0 951 883 | 10/1999 |
| EP | 1 333 650 | 8/2003 |
| EP | 1 569 422 | 8/2005 |
| FR | 2 761 800 | 9/1998 |
| FR | 2 761 800 | 10/1998 |
| GB | 2 375 276 | 11/2002 |
| GB | 2 390 264 | 12/2003 |
| JP | 3108997 | 5/1991 |
| JP | 04245720 | 9/1992 |
| JP | 5276587 | 10/1993 |
| JP | 8065781 | 3/1996 |
| JP | 8070344 | 3/1996 |
| JP | 8079868 | 3/1996 |
| JP | 8195994 | 7/1996 |
| JP | 08214391 | 8/1996 |
| JP | 09284877 | 10/1997 |
| JP | 10-023122 | 1/1998 |
| JP | 10-023123 | 1/1998 |
| JP | 11265199 | 9/1999 |
| JP | 2001119797 | 10/1999 |
| JP | 2001245397 | 2/2000 |
| JP | 2002-09688 | 7/2000 |
| JP | 2000196723 | 7/2000 |
| JP | 2000250577 | 9/2000 |
| JP | 2000261529 | 9/2000 |
| JP | 2000261530 | 9/2000 |
| JP | 2000261534 | 9/2000 |
| JP | 2000354284 | 12/2000 |
| JP | 20012924989 | 10/2001 |
| JP | 2002-125298 | 4/2002 |
| JP | 2002-358089 | 12/2002 |
| JP | 2003143253 | 5/2003 |
| JP | WO 2004/012477 | 2/2004 |
| WO | WO 93/01664 | 1/1993 |
| WO | WO 95/17746 | 6/1995 |
| WO | WO 99/04500 | 1/1999 |
| WO | WO 00/21194 | 4/2000 |
| WO | WO 00/45248 | 8/2000 |
| WO | WO 02/07477 | 1/2002 |
| WO | WO 02/077972 S1 | 10/2002 |
| WO | WO 02/098169 A1 | 12/2002 |
| WO | WO 03/055270 A1 | 7/2003 |
| WO | WO-2004/012477 | 5/2004 |

OTHER PUBLICATIONS

RD 418033, Feb. 10, 1999.
U.S. Appl. No. 11/156,434, filed Jun. 20, 2005, Zicheng et al.
O.M. Strand, T. Holter, A. Egeberg, and S. Stensby, "On the Feasibility of ASR in Extreme Noise Using the PARAT Earplug Communication Terminal," ASRU 2003, St. Thomas, U.S. Virgin Islands, Nov. 20-Dec. 4, 2003.

Z. Zhang, Z. Liu, M. Sinclair, A. Acero, L. Deng, J. Droppo, X. D. Huang, Y. Zheng, "Multi-Sensory Microphones For Robust Speech Detection, Enchantment, and Recognition," ICASSP 04, Montreal, May 17-21, 2004.

Search Report dated Dec. 17, 2004 from International Application No. 04016226.5.

European Search Report from Application No. 05107921.8, filed Aug. 30, 2005.

European Search Report from Application No. 05108871.4, filed Sep. 26, 2005.

http://www.snaptrack.com/ (2004).

http://www.misumi.com.tw/PLIST.ASP?PC.ID:21 (2004).

http://www.wherifywireless.com/univLoc.asp (2001).

http://www.wherifywireless.com/prod.watches.htm (2001).

Microsoft Office, Live Communications Server 2003, Microsoft Corporation, pp. 1-10, 2003.

Shoshana Berger, http://www.cnn.com/technology, "Wireless, wearable, and wondrous tech," Jan. 17, 2003.

http://www.3G.co.uk, "NTT DoCoMo to Introduce First Wireless GPS Handset," Mar. 27, 2003.

"Physiological Monitoring System 'Lifeguard' System Specifications," Stanford University Medical Center, National Biocomputation Center, Nov. 8, 2002.

Nagl, L., "Wearable Sensor System for Wireless State-of-Health Determination in Cattle;" Annual International Conference of the Institute of Electrical and Electronics Engineers Engineering in Medicine and Biology Society, 2003.

Asada, H. and Barbagelata, M., "Wireless Fingernail Sensor for Continuous Long Term Health Monitoring," MIT Home Automation and Healthcare Consortium, Phase 3, Progress Report No. 3-1, Apr. 2001.

Kumar, V., "The Design and Testing of a Personal Health System to Motivate Adherence to Intensive Diabetes Management," Harvard-MIT Division of Health Sciences and Technology, pp. 1-66, 2004.

Baker, "The Insight of Wireless Communication," Research and Development, 2002, Student Conference on Jul. 16-17, 2002.

Zheng Y. et al., "Air and Bone-Conductive Integrated Microphones for Robust Speech Detection and Enhancement" Automatic Speech Recognition and Understanding 2003. pp. 249-254.

De Cuetos P. et al. "Audio-visual intent-to-speak detection for human-computer interaction" vol. 6, Jun. 5, 2000. pp. 2373-2376.

M. Graciarena, H. Franco, K. Sonmez, and H. Bratt, "Combining Standard and Throat Microphones for Robust Speech Recognition," IEEE Signal Processing Letters, vol. 10, No. 3, pp. 72-74, Mar. 2003.

P. Heracleous, Y. Nakajima, A. Lee, H. Saruwatari, K. Shikano, "Accurate Hidden Markov Models for Non-Audible Murmur (NAM) Recognition Based on Iterative Supervised Adaptation," ASRU 2003, St. Thomas, U.S. Virgin Islands, Nov. 20-Dec. 4, 2003.

U.S. Appl. No. 10/629,278, filed Jul. 29, 2003, Huang et al.

U.S. Appl. No. 10/724,008, filed Nov. 26, 2003, Zicheng et al.

U.S. Appl. No. 10/636,176, filed Aug. 7, 2003, Huang et al.

The Written Opinion from Foreign Application No. SG 200500289-4, filed Jan. 18, 2005.

The Office Action from Foreign Application No. 121-2005, filed Jan. 21, 2005.

The European Search Report from foreign application No. 04025457.5 filed Oct. 26, 2004.

The European Search Report from foreign application No. 05101071.8 filed Feb. 14, 2005.

An Office Action in foreign application No. PA/a/2005/002133 filed Feb. 23, 2005.

Israeli Examination Report in foreign application No. 166473, filed Feb. 24, 2004.

* cited by examiner

METHOD AND APPARATUS FOR
MULTI-SENSORY SPEECH ENHANCEMENT
ON A MOBILE DEVICE

BACKGROUND OF THE INVENTION

The present invention relates to noise reduction. In particular, the present invention relates to removing noise from speech signals received by mobile hand-held devices.

Mobile hand-held devices such as mobile phones and personal digital assistants that provide phone functions or accept speech input are often used in adverse noise environments such as busy streets, restaurants, airports, and cars. The strong ambient noise in these environments can obscure the user's speech and make it difficult to understand what the person is saying.

While noise filtering systems have been developed that attempt to remove noise based on a model of the noise, these systems have not been able to remove all of the noise. In particular, many of these systems have found it difficult to remove noise that consists of other people speaking in the background. One reason for this is that it is extremely difficult, if not impossible, for these systems to determine that a speech signal received by a microphone came from someone other than the person using the mobile device.

For phone headsets, which are kept in position on the user's head by looping the headset over the user's head or ear, systems have been developed that provide more robust noise filtering by relying on additional types of sensors in the headset. In one example, a bone conduction sensor is placed on one end of the head set and is pressed into contact with the skin covering the users skull, ear, or mandible by the resilience of the headset. The bone conduction sensor detects vibrations in the skull, ear or mandible that are created when the user speaks. Using the signal from the bone conduction sensor, this system is able to better identify when the user is speaking and as a result is better able to filter noise in the speech signal.

Although such systems work well for headsets, where contact between the bone conduction sensor and the user is maintained by the mechanical design of the headsets, these systems cannot be used directly in hand-held mobile devices because it is difficult for users to maintain the bone conduction sensor in the proper position and these systems do not take into consideration that the bone conduction sensor may not be held in the proper position.

SUMMARY OF THE INVENTION

A mobile device is provided that includes a digit input that can be manipulated by a user's fingers or thumb, an air conduction microphone and an alternative sensor that provides an alternative sensor signal indicative of speech. Under some embodiments, the mobile device also includes a proximity sensor that provides a proximity signal indicative of the distance from the mobile device to an object. Under some embodiments, the signal from the air conduction microphone, the alternative sensor signal, and the proximity signal are used to form an estimate of a clean speech value. In further embodiments, a sound is produced through a speaker in the mobile device based on the amount of noise in the clean speech value. In other embodiments, the sound produced through the speaker is based on the proximity sensor signal.

DETAILED DESCRIPTION OF ILLUSTRATIVE EMBODIMENTS

Figure 1:
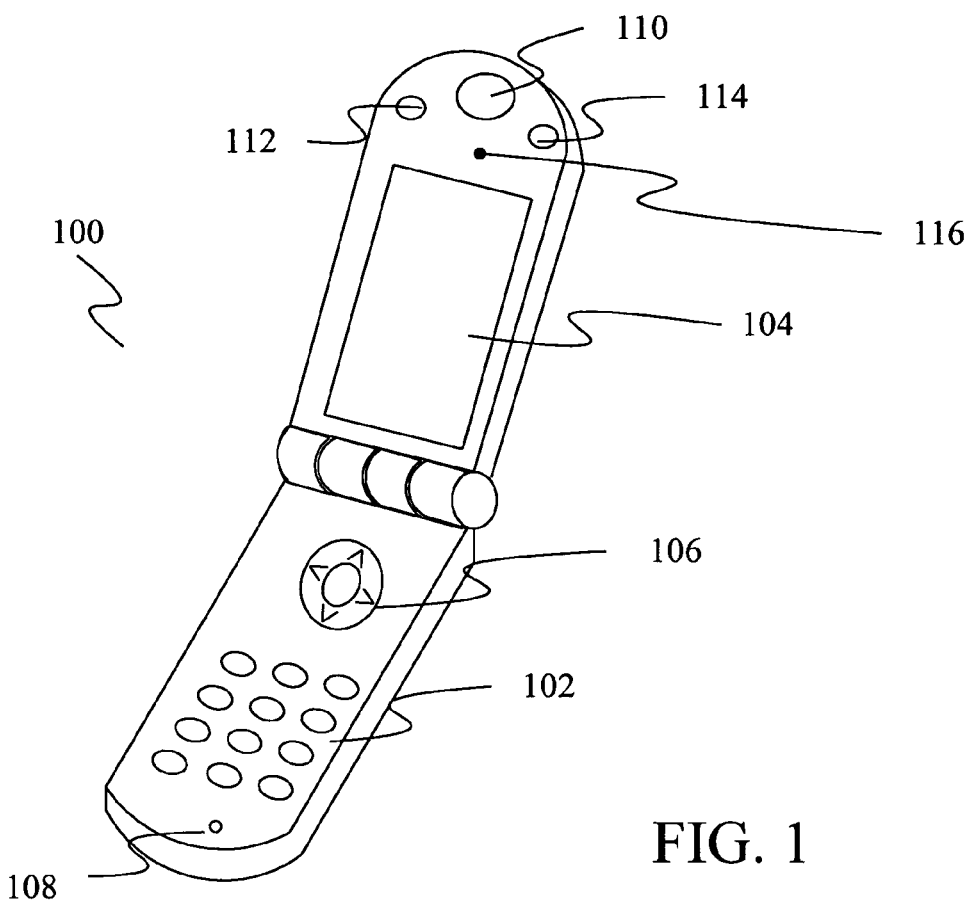
FIG. 1 is a perspective view of one embodiment of the present invention.

Embodiments of the present invention provide hand-held mobile devices that contain both an air conduction microphone and an alternative sensor that can be used in speech detection and noise filtering. FIG. 1 provides an example embodiment in which the hand-held mobile device is a mobile phone 100. Mobile phone 100 includes a key pad 102, a display 104, a cursor control 106, an air conduction microphone 108, a speaker 110, two bone-conduction microphones 112 and 114, and optionally a proximity sensor 116.

Touchpad 102 allows the user to enter numbers and letters into the mobile phone. In other embodiments, touchpad 102 is combined with display 104 in the form of a touch screen. Cursor control 106 allows the user to highlight and select information on display 104 and to scroll through images and pages that are larger than display 104.

Figure 2:
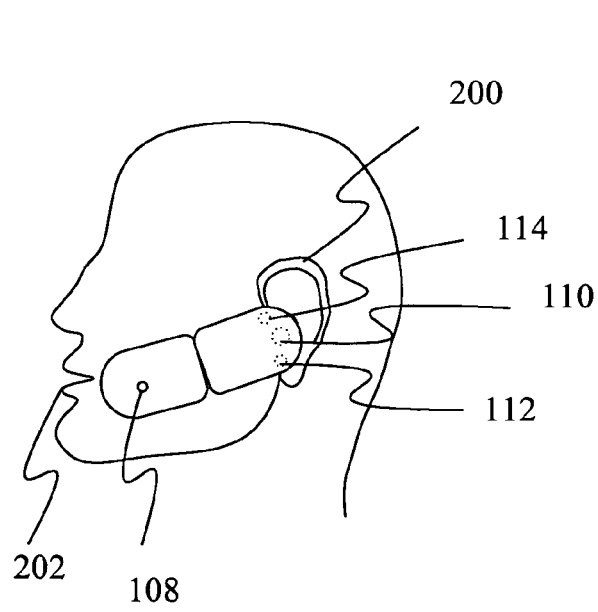
FIG. 2 shows the phone of FIG. 1 in position on the left side of a user's head.
Figure 3:
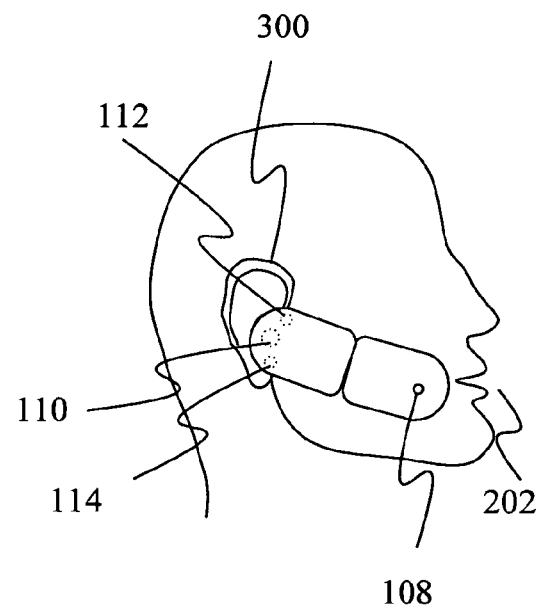
FIG. 3 shows the phone of FIG. 1 in position on the right side of a user's head.

As shown in FIGS. 2 and 3, when mobile phone 100 is put in the standard position for conversing over the phone, speaker 110 is positioned near the user's left ear 200 or right ear 300, and air conduction microphone 108 is positioned near the user's mouth 202. When the phone is positioned near the user's left ear, as in FIG. 2, bone conduction microphone 114 contacts the user's skull or ear and produces an alternative sensor signal that can be used to remove noise from the speech signal received by air conduction microphone 108. When the phone is positioned near the user's right ear, as in FIG. 3, bone conduction microphone 112 contacts the user's skull or ear and produces an alternative sensor signal that can be used to remove noise from the speech signal.

The optional proximity sensor 116 indicates how close the phone is to the user. As discussed further below, this information is used to weight the contribution of the bone conduction microphones in producing the clean speech value. In general, if the proximity detector detects that the phone is next to the user, the bone conduction microphone signals are weighted more heavily than if the phone is some distance from the user. This adjustment reflects the fact that the bone conduction microphone signal is more indicative of the user speaking when it is in contact with the user. When it is apart from the user, it is more susceptible to ambient noise. The proximity sensor is used in embodiments of the present invention because users do not always hold the phone pressed to their heads.

Figure 4:
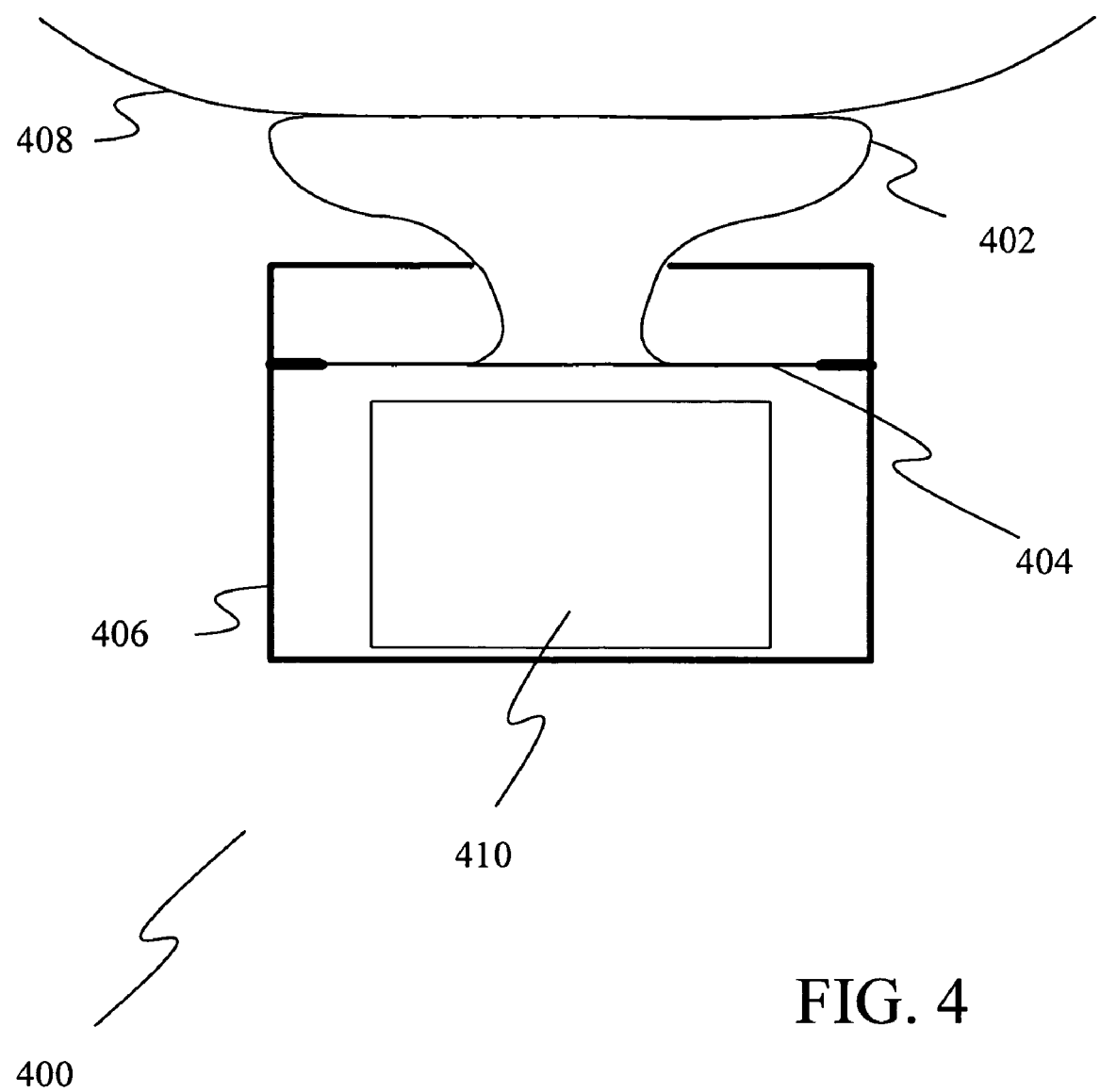
FIG. 4 is a block diagram of a bone conduction microphone.

FIG. 4 shows one embodiment of a bone conduction sensor 400 of the present invention. In sensor 400, a soft elastomer bridge 402 is adhered to a diaphragm 404 of a normal air conduction microphone 406. This soft bridge 402 conducts vibrations from skin contact 408 of the user directly to the diaphragm 404 of microphone 406. The movement of diaphragm 404 is converted into an electrical signal by a transducer 410 in microphone 406.

Figure 5:
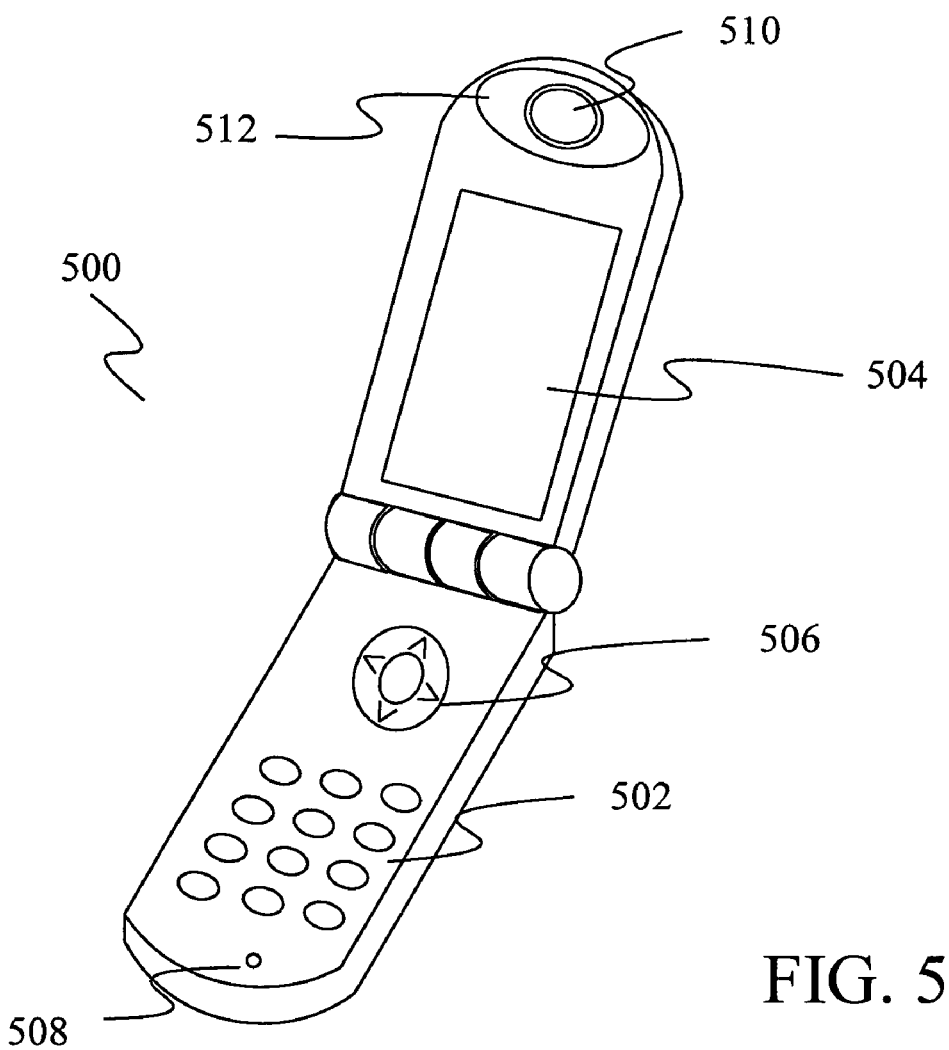
FIG. 5 is a perspective view of an alternative embodiment of the present invention.

FIG. 5 provides an alternative mobile phone embodiment 500 of the hand-held mobile device of the present invention. Mobile phone 500 includes a key pad 502, a display 504, a cursor control 506, an air conduction microphone 508, a speaker 510, and a combination bone-conduction microphone and proximity sensor 512.

Figure 6:
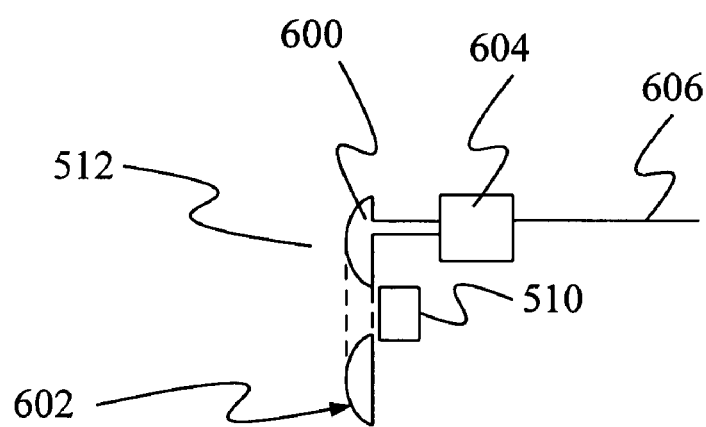
FIG. 6 is a cross-section of an alternative bone-conduction microphone under one embodiment of the present invention.

As shown in the cross-section of FIG. 6, combination bone-conduction microphone and proximity sensor 512 consists of a soft, medium-filled (with fluid or elastomer) pad 600 that has an outer surface 602 designed to contact the user when the user places the phone against their ear. Pad 600 forms a ring around an opening that provides a passageway for sound from speaker 510, which is located in the opening or directly below the opening within phone 500. Pad 600 is not limited to this shape and any shape for the pad may be used. In general, however, it is preferred if pad 600 includes portions to the left and right of speaker 510 so that at least one part of pad 600 is in contact with the user regardless of which ear the user places the phone against. The portions of the pad may be externally continuous or may be externally separate but fluidly connected to each other within the phone.

An electronic pressure transducer 604 is hydraulically connected to the fluid or elastomer in pad 600 and converts the pressure of the fluid in pad 600 into an electrical signal on conductor 606. Examples of electronic pressure transducer 604 include MEMS-based transducers. In general, pressure transducer 604 should have a high frequency response.

The electrical signal on conductor 606 includes two components, a DC component and an AC component. The DC component provides a proximity sensor signal because the static pressure within pad 600 will by higher when the phone is pressed against the user's ear than when the phone is some distance from the user's ear. The AC component of the electrical signal provides a bone-conduction microphone signal because vibrations in the bones of the user's skull, jaw or ear create fluctuations in pressure in pad 600 that are converted into an AC electrical signal by pressure transducer 604. Under one embodiment, a filter is applied to the electrical signal to allow the DC component of the signal and AC components above a minimum frequency to pass.

Although two examples of bone conduction sensors have been described above, other forms for the bone conduction sensor are within the scope of the present invention.

Figure 7:
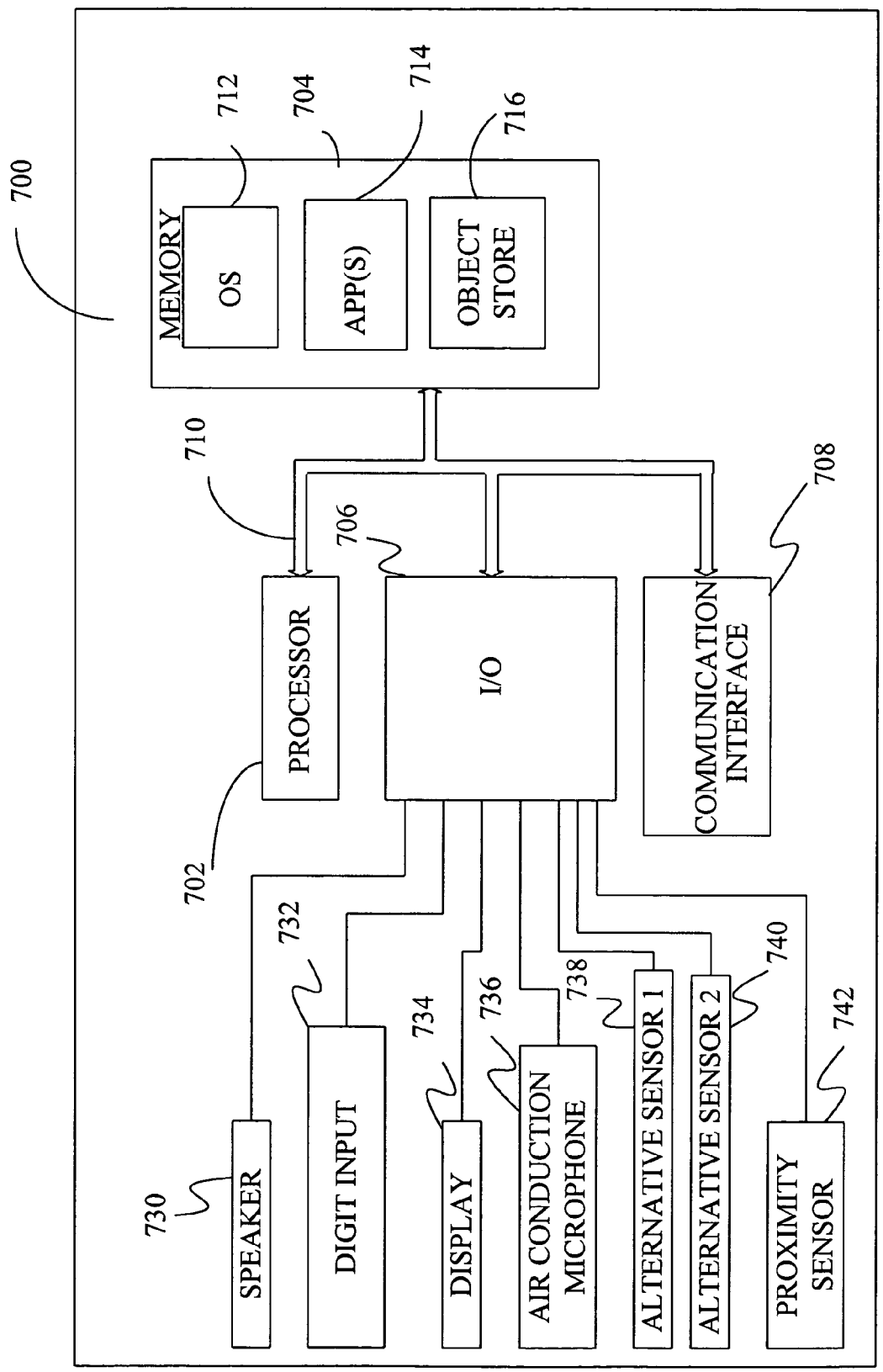
FIG. 7 is a block diagram of a mobile device under one embodiment of the present invention.

FIG. 7 is a block diagram of a mobile device 700, under one embodiment of the present invention. Mobile device 700 includes a microprocessor 702, memory 704, input/output (I/O) interface 706, and a communication interface 708 for communicating with remote computers, communication networks, or other mobile devices. In one embodiment, the afore-mentioned components are coupled for communication with one another over a suitable bus 710.

Memory 704 may be implemented as non-volatile electronic memory such as random access memory (RAM) with a battery back-up module (not shown) such that information stored in memory 704 is not lost when the general power to mobile device 700 is shut down. Alternatively, all or portions of memory 704 may be volatile or non-volatile removable memory. A portion of memory 704 is preferably allocated as addressable memory for program execution, while another portion of memory 704 is preferably used for storage, such as to simulate storage on a disk drive.

Memory 704 includes an operating system 712, application programs 714 as well as an object store 716. During operation, operating system 712 is preferably executed by processor 702 from memory 704. Operating system 712, in one preferred embodiment, is a WINDOWS® CE brand operating system commercially available from Microsoft Corporation. Operating system 712 is preferably designed for mobile devices, and implements database features that can be utilized by applications 714 through a set of exposed application programming interfaces and methods. The objects in object store 716 are maintained by applications 714 and operating system 712, at least partially in response to calls to the exposed application programming interfaces and methods.

Communication interface 708 represents numerous devices and technologies that allow mobile device 700 to send and receive information. In mobile phone embodiments, communication interface 708 represents a cellular phone network interface that interacts with a cellular phone network to allow calls to be placed and received. Other devices possibly represented by communication interface 708 include wired and wireless modems, satellite receivers and broadcast tuners to name a few. Mobile device 700 can also be directly connected to a computer to exchange data therewith. In such cases, communication interface 708 can be an infrared transceiver or a serial or parallel communication connection, all of which are capable of transmitting streaming information.

The computer-executable instructions that are executed by processor 702 to implement the present invention may be stored in memory 704 or received across communication interface 708. These instructions are found in a computer readable medium, which, without limitation, can include computer storage media and communication media.

Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Input/output interface 706 represents interfaces to a collection of input and output devices including speaker 730, digit input 732 (such as one or a set of buttons, a touch screen, a trackball, a mouse pad, a roller, or a combination of these components that can be manipulated by a user's thumb or finger), display 734, air conduction microphone 736, alternative sensor 738, alternative sensor 740, and proximity sensor 742. Under one embodiment, alternative sensors 738 and 740 are bone conduction microphones. The devices listed above are by way of example and need not all be present on mobile device 700. Further, in at least one embodiment, the alternative sensor and the proximity sensor are combined as a single sensor that provides a proximity sensor signal and an alternative sensor signal. These signals may be placed on separate conduction lines or may be components of a signal on a single line. In addition, other input/output devices may be attached to or found with mobile device 700 within the scope of the present invention.

Figure 8:
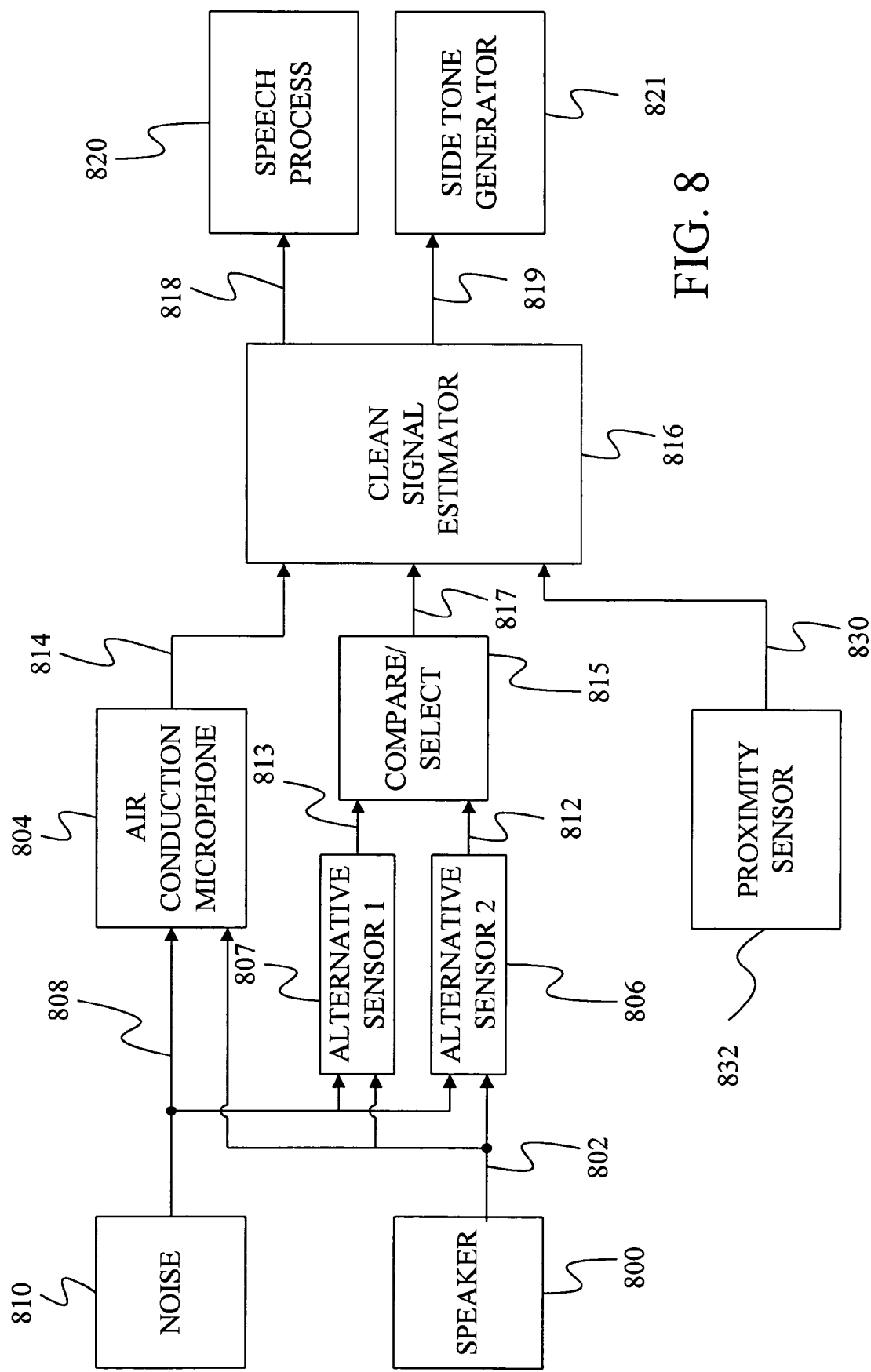
FIG. 8 is a block diagram of a general speech processing system of the present invention.

FIG. 8 provides a basic block diagram of of a speech processing system of embodiments of the present invention. In FIG. 8, a speaker 800 generates a speech signal 802 that is detected by an air conduction microphone 804 and one or both of an alternative sensor 806 and an alternative sensor 807. One example of an alternative sensor is a bone conduction sensor that is located on or adjacent a facial or skull bone of the user (such as the jaw bone) or on the ear of the user and that senses vibrations of the ear, skull or jaw that correspond to speech generated by the user. Another example of an alternative sensor is an infrared sensor that is pointed at and detects the motion of the user's mouth. Note that in some embodiments, only one alternative sensor will be present. Air conduction microphone 804 is the type of microphone that is used commonly to convert audio air-waves into electrical signals.

Air conduction microphone 804 also receives noise 808 generated by one or more noise sources 810. Depending on the type of alternative sensor and the level of the noise, noise 808 may also be detected by alternative sensors 806 and 807. However, under embodiments of the present invention, alternative sensors 806 and 807 are typically less sensitive to ambient noise than air conduction microphone 804. Thus, the alternative sensor signals 812 and 813 generated by alternative sensors 806 and 807, respectively, generally include less noise than air conduction microphone signal 814 generated by air conduction microphone 804.

If there are two alternative sensors, such as two bone conduction sensors, sensor signals 812 and 813 can be optionally provided to a compare/select unit 815. Compare/select unit 815 compares the strength of the two signals and selects the stronger signal as its output 817. The weaker signal is not passed on for further processing. For mobile phone embodiments, such as the mobile phone of FIGS. 1-3, compare/select unit 815 will usually select the signal generated by the bone conduction sensor that is in contact with the user's skin. Thus, in FIG. 2, the signal from bone conduction sensor 114 would be selected and in FIG. 3, the signal from bone conduction sensor 112 would be selected.

Alternative sensor signal 817 and air conduction microphone signal 814 are provided to a clean signal estimator 816, which estimates a clean speech signal 818 through a process discussed below in detail. Optionally, clean signal estimator 816 also receives a proximity signal 830 from a proximity sensor 832 that is used in estimating clean signal 818. As noted above, the proximity sensor may be combined with an alternative sensor signal under some embodiments. Clean signal estimate 818 is provided to a speech process 820. Clean speech signal 818 may either be a filtered time-domain signal or a feature domain vector. If clean signal estimate 818 is a time-domain signal, speech process 820 may take the form of a listener, a cellular phone transmitter, a speech coding system, or a speech recognition system. If clean speech signal 818 is a feature domain vector, speech process 820 will typically be a speech recognition system.

Clean signal estimator 816 also produces a noise estimate 819, which indicates the estimated noise that is in clean speech signal 818. Noise estimate 819 is provided to a side tone generator 821, which generates a tone through the speakers of the mobile device based on noise estimate 819. In particular, side tone generator 821 increases the volume of the side tone as noise estimate 819 increases.

The side tone provides feedback to the user that indicates whether the user is holding the mobile device in the best position to take advantage of the alternative sensor. For example, if the user is not pressing the bone conduction sensor against their head, the clean signal estimator will receive a poor alternative sensor signal and will produce a noisy clean signal 818 because of the poor alternative sensor signal. This will result in a louder side tone. As the user brings the bone conduction sensor into contact with their head, the alternative sensor signal will improve thereby reducing the noise in clean signal 818 and reducing the volume of the side tone. Thus, a user can quickly learn how to hold the phone to best reduce the noise in the clean signal based on the feedback in the side tone.

In alternative embodiments, the side tone is generated based on the proximity sensor signal 830 from proximity sensor 832. When the proximity sensor indicates that the phone is contacting or extremely close to the user's head, the side tone volume will be low. When the proximity sensor indicates that the phone is away from the user's head, the side tone will be louder.

The present invention utilizes several methods and systems for estimating clean speech using air conduction microphone signal 814, alternative sensor signal 817, and optionally proximity sensor signal 830. One system uses stereo training data to train correction vectors for the alternative sensor signal. When these correction vectors are later added to a test alternative sensor vector, they provide an estimate of a clean signal vector. One further extension of this system is to first track time-varying distortions and then to incorporate this information into the computation of the correction vectors and into the estimation of the clean speech.

A second system provides an interpolation between the clean signal estimate generated by the correction vectors and an estimate formed by subtracting an estimate of the current noise in the air conduction test signal from the air conduction signal. A third system uses the alternative sensor signal to estimate the pitch of the speech signal and then uses the estimated pitch to identify an estimate for the clean speech signal. Each of these systems is discussed separately below.

Training Stereo Correction Vectors

Figure 9:
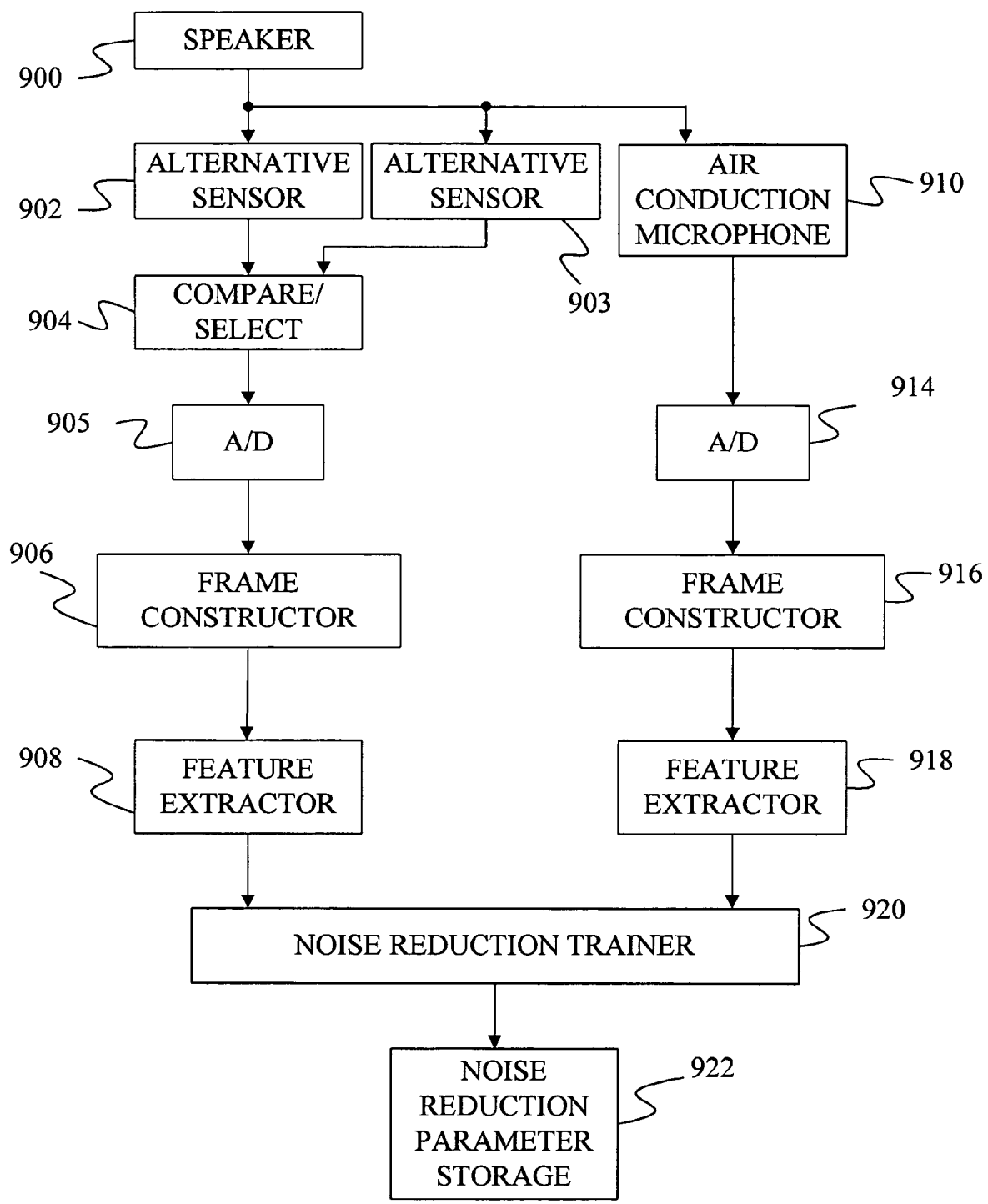
FIG. 9 is a block diagram of a system for training noise reduction parameters under one embodiment of the present invention.
Figure 10:
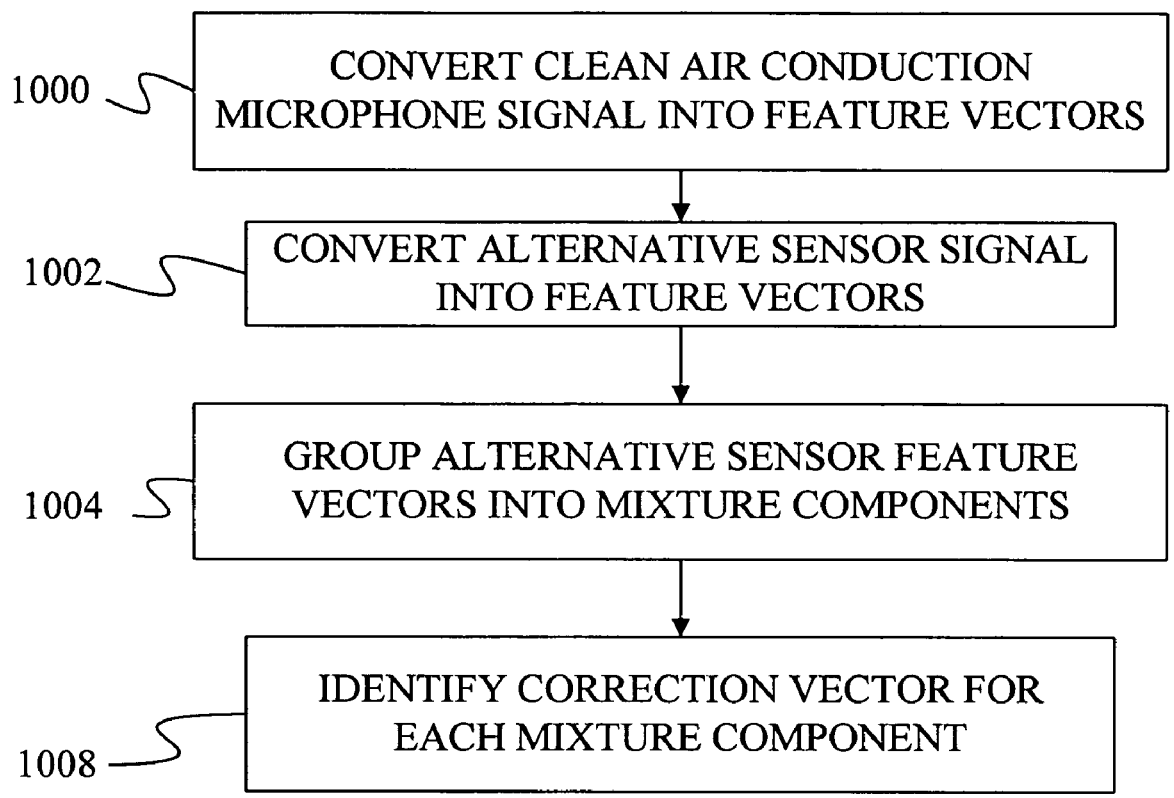
FIG. 10 is a flow diagram for training noise reduction parameters using the system of FIG. 9.

FIGS. 9 and 10 provide a block diagram and flow diagram for training stereo correction vectors for the two embodiments of the present invention that rely on correction vectors to generate an estimate of clean speech.

The method of identifying correction vectors begins in step 1000 of FIG. 10, where a "clean" air conduction microphone signal is converted into a sequence of feature vectors. To do this, a speaker 900 of FIG. 9, speaks into an air conduction microphone 910, which converts the audio waves into electrical signals. The electrical signals are then sampled by an analog-to-digital converter 914 to generate a sequence of digital values, which are grouped into frames of values by a frame constructor 916. In one embodiment, A-to-D converter 914 samples the analog signal at 16 kHz and 16 bits per sample, thereby creating 32 kilobytes of speech data per second and frame constructor 916 creates a new frame every 10 milliseconds that includes 25 milliseconds worth of data.

Each frame of data provided by frame constructor 916 is converted into a feature vector by a feature extractor 918. Under one embodiment, feature extractor 918 forms cepstral features. Examples of such features include LPC derived cepstrum, and Mel-Frequency Cepstrum Coefficients. Examples of other possible feature extraction modules that may be used with the present invention include modules for performing Linear Predictive Coding (LPC), Perceptive Linear Prediction (PLP), and Auditory model feature extraction. Note that the invention is not limited to these feature extraction modules and that other modules may be used within the context of the present invention.

In step 1002 of FIG. 10, an alternative sensor signal is converted into feature vectors. Although the conversion of step 1002 is shown as occurring after the conversion of step 1000, any part of the conversion may be performed before, during or after step 1000 under the present invention. The conversion of step 1002 is performed through a process similar to that described above for step 1000.

In the embodiment of FIG. 9, this process begins when alternative sensors 902 and 903 detect a physical event associated with the production of speech by speaker 900 such as bone vibration or facial movement. Because alternative sensor 902 and 903 are spaced apart on the mobile device, they will not detect the same values in connection with the production of speech. Alternative sensors 902 and 903 convert the physical event into analog electrical signals. These electrical signals are provided to a compare/select unit 904, which identifies the stronger of the two signals and provides the stronger signal at its output. Note that in some embodiments, only one alternative sensor is used. In such cases, compare/select unit 904 is not present.

The selected analog signal is sampled by an analog-to-digital converter 905. The sampling characteristics for A/D converter 905 are the same as those described above for A/D converter 914. The samples provided by A/D converter 905 are collected into frames by a frame constructor 906, which acts in a manner similar to frame constructor 916. The frames of samples are then converted into feature vectors by a feature extractor 908, which uses the same feature extraction method as feature extractor 918.

The feature vectors for the alternative sensor signal and the air conductive signal are provided to a noise reduction trainer 920 in FIG. 9. At step 1004 of FIG. 10, noise reduction trainer 920 groups the feature vectors for the alternative sensor signal into mixture components. This grouping can be done by grouping similar feature vectors together using a maximum likelihood training technique or by grouping feature vectors that represent a temporal section of the speech signal together. Those skilled in the art will recognize that other techniques for grouping the feature vectors may be used and that the two techniques listed above are only provided as examples.

Noise reduction trainer 920 then determines a correction vector, $r_s$, for each mixture component, s, at step 1008 of FIG. 10. Under one embodiment, the correction vector for each mixture component is determined using maximum likelihood criterion. Under this technique, the correction vector is calculated as:

$$r_s = \frac{\sum_t p(s|b_t)(x_t - b_t)}{\sum_t p(s|b_t)} \quad \text{EQ. 1}$$

Where $x_t$ is the value of the air conduction vector for frame t and $b_t$ is the value of the alternative sensor vector for frame t. In Equation 1:

$$p(s|b_t) = \frac{p(b_t|s)p(s)}{\sum_s p(b_t|s)p(s)} \quad \text{EQ. 2}$$

where p(s) is simply one over the number of mixture components and $p(b_t|s)$ is modeled as a Gaussian distribution:

$$p(b_t|s) = N(b_t; \mu_b, \Gamma_b) \quad \text{EQ. 3}$$

with the mean $\mu_b$ and variance $\Gamma_b$ trained using an Expectation Maximization (EM) algorithm where each iteration consists of the following steps:

$$\gamma_s(t) = p(s|b_t) \quad \text{EQ. 4}$$

$$\mu_s = \frac{\sum_t \gamma_s(t) b_t}{\sum_t \gamma_s(t)} \quad \text{EQ. 5}$$

$$\Gamma_s = \frac{\sum_t \gamma_s(t)(b_t - \mu_s)(b_t - \mu_s)^T}{\sum_t \gamma_s(t)} \quad \text{EQ. 6}$$

EQ. 4 is the E-step in the EM algorithm, which uses the previously estimated parameters. EQ. 5 and EQ. 6 are the M-step, which updates the parameters using the E-step results.

The E- and M-steps of the algorithm iterate until stable values for the model parameters are determined. These parameters are then used to evaluate equation 1 to form the correction vectors. The correction vectors and the model parameters are then stored in a noise reduction parameter storage 922.

After a correction vector has been determined for each mixture component at step 1008, the process of training the noise reduction system of the present invention is complete. Once a correction vector has been determined for each mixture, the vectors may be used in a noise reduction technique of the present invention. Two separate noise reduction techniques that use the correction vectors are discussed below.

Noise Reduction Using Correction Vector and Noise Estimate

Figure 11:
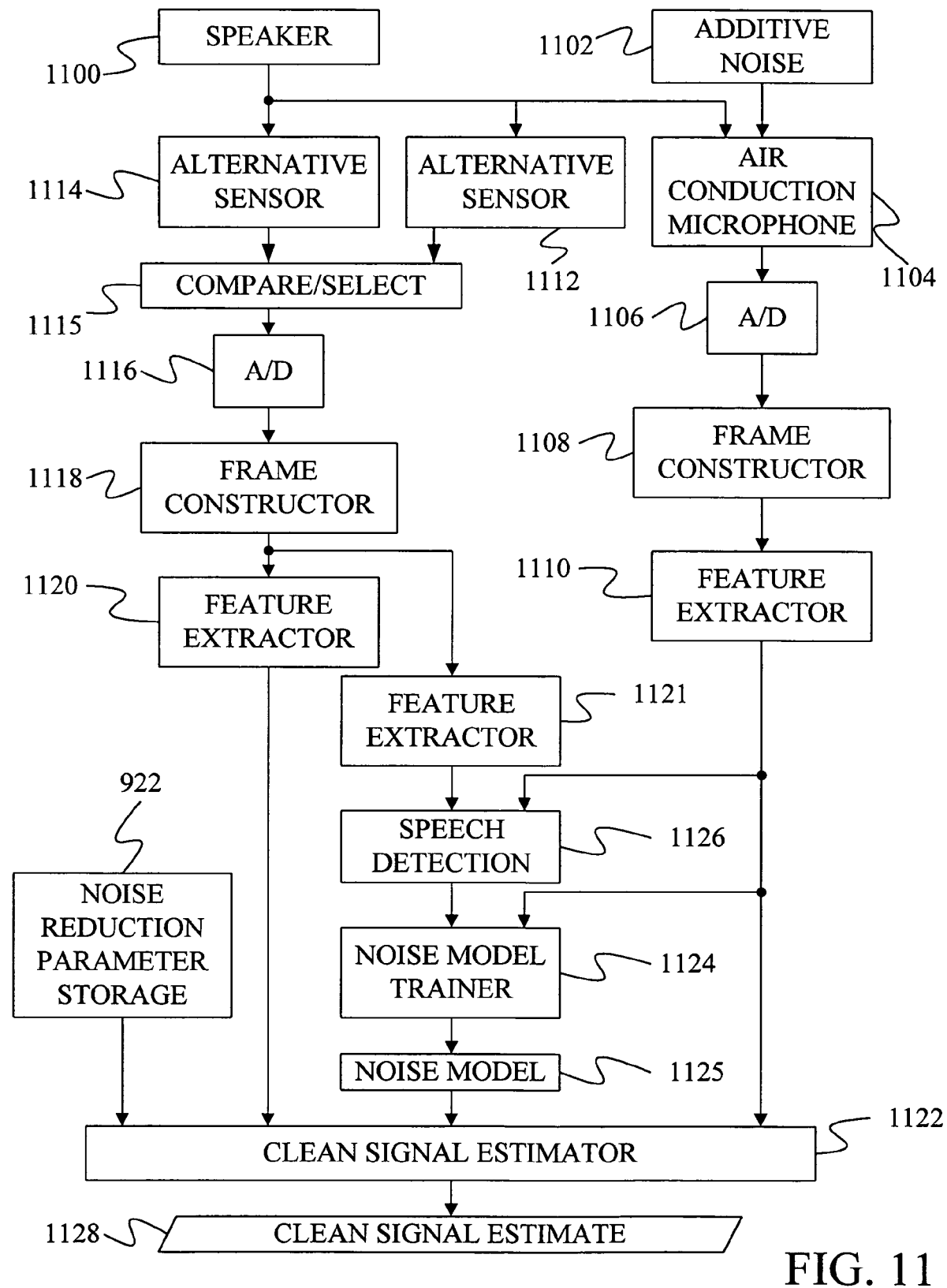
FIG. 11 is a block diagram of a system for identifying an estimate of a clean speech signal from a noisy test speech signal under one embodiment of the present invention.
Figure 12:
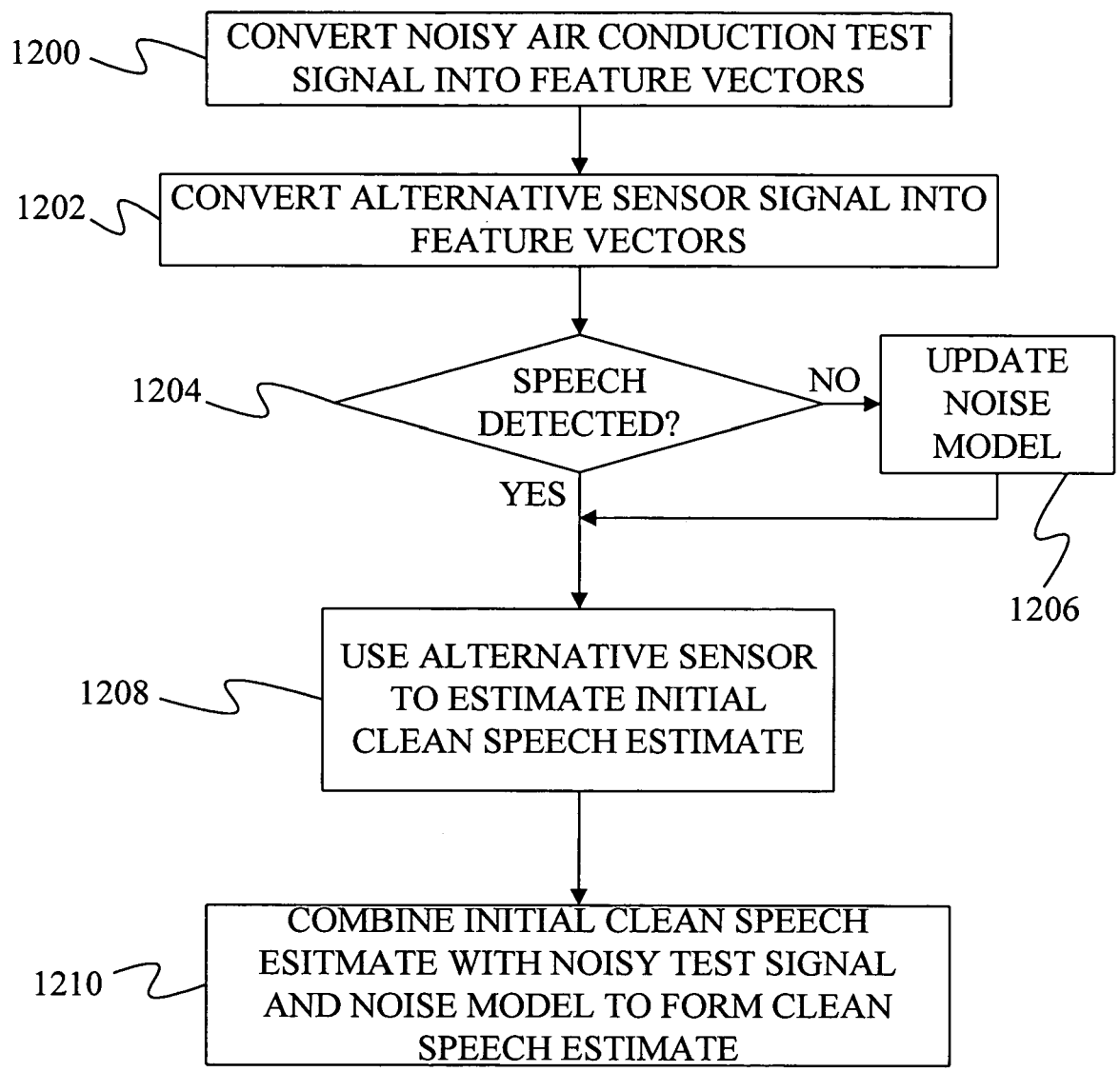
FIG. 12 is a flow diagram of a method for identifying an estimate of a clean speech signal using the system of FIG. 11.

A system and method that reduces noise in a noisy speech signal based on correction vectors and a noise estimate is shown in the block diagram of FIG. 11 and the flow diagram of FIG. 12, respectively.

At step 1200, an audio test signal detected by an air conduction microphone 1104 is converted into feature vectors. The audio test signal received by microphone 1104 includes speech from a speaker 1100 and additive noise from one or more noise sources 1102. The audio test signal detected by microphone 1104 is converted into an electrical signal that is provided to analog-to-digital converter 1106.

A-to-D converter 1106 converts the analog signal from microphone 1104 into a series of digital values. In several embodiments, A-to-D converter 1106 samples the analog signal at 16 kHz and 16 bits per sample, thereby creating 32 kilobytes of speech data per second. These digital values are provided to a frame constructor 1108, which, in one embodiment, groups the values into 25 millisecond frames that start 10 milliseconds apart.

The frames of data created by frame constructor 1108 are provided to feature extractor 1110, which extracts a feature from each frame. Under one embodiment, this feature extractor is different from feature extractors 908 and 918 that were used to train the correction vectors. In particular, under this embodiment, feature extractor 1110 produces power spectrum values instead of cepstral values. The extracted features are provided to a clean signal estimator 1122, a speech detection unit 1126 and a noise model trainer 1124.

At step 1202, a physical event, such as bone vibration or facial movement, associated with the production of speech by speaker 1100 is converted into a feature vector. Although shown as a separate step in FIG. 12, those skilled in the art will recognize that portions of this step may be done at the same time as step 1200. During step 1202, the physical event is detected by one or both of alternative sensors 1112 and 1114. Alternative sensors 1112 and 1114 generate analog electrical signals based on the physical event. The analog signals are provided to a compare and select unit 1115, which selects the larger magnitude signal as its output. Note that in some embodiments, only one alternative sensor is provided. In such embodiments, compare and select unit 1115 is not needed.

The selected analog signal is converted into a digital signal by analog-to-digital converter 1116 and the resulting digital samples are grouped into frames by frame constructor 1118. Under one embodiment, analog-to-digital converter 1116 and frame constructor 1118 operate in a manner similar to analog-to-digital converter 1106 and frame constructor 1108.

The frames of digital values are provided to a feature extractor 1120, which uses the same feature extraction technique that was used to train the correction vectors. As mentioned above, examples of such feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. In many embodiments, however, feature extraction techniques that produce cepstral features are used.

The feature extraction module produces a stream of feature vectors that are each associated with a separate frame of the speech signal. This stream of feature vectors is provided to clean signal estimator 1122.

The frames of values from frame constructor 1118 are also provided to a feature extractor 1121, which in one embodiment extracts the energy of each frame. The energy value for each frame is provided to a speech detection unit 1126.

At step 1204, speech detection unit 1126 uses the energy feature of the alternative sensor signal to determine when speech is likely present. This information is passed to noise model trainer 1124, which attempts to model the noise during periods when there is no speech at step 1206.

Under one embodiment, speech detection unit 1126 first searches the sequence of frame energy values to find a peak in the energy. It then searches for a valley after the peak. The energy of this valley is referred to as an energy separator, d. To determine if a frame contains speech, the ratio, k, of the energy of the frame, e, over the energy separator, d, is then determined as: k=e/d. A speech confidence, q, for the frame is then determined as:

$$q = \begin{cases} 0 & : k < 1 \\ \frac{k-1}{\alpha - 1} & : 1 \leq k \leq \alpha \\ 1 & : k > \alpha \end{cases} \quad \text{EQ. 7}$$

where α defines the transition between two states and in one implementation is set to 2. Finally, the average confidence value of its 5 neighboring frames (including itself) are used as the final confidence value for this frame.

Under one embodiment, a fixed threshold value is used to determine if speech is present such that if the confidence value exceeds the threshold, the frame is considered to contain speech and if the confidence value does not exceed the threshold, the frame is considered to contain non-speech. Under one embodiment, a threshold value of 0.1 is used.

For each non-speech frame detected by speech detection unit 1126, noise model trainer 1124 updates a noise model 1125 at step 1206. Under one embodiment, noise model 1125 is a Gaussian model that has a mean $\mu_n$ and a variance $\Sigma_n$. This model is based on a moving window of the most recent frames of non-speech. Techniques for determining the mean and variance from the non-speech frames in the window are well known in the art.

Correction vectors and model parameters in parameter storage 922 and noise model 1125 are provided to clean signal estimator 1122 with the feature vectors, b, for the alternative sensor and the feature vectors, $S_y$, for the noisy air conduction microphone signal. At step 1208, clean signal estimator 1122 estimates an initial value for the clean speech signal based on the alternative sensor feature vector, the correction vectors, and the model parameters for the alternative sensor. In particular, the alternative sensor estimate of the clean signal is calculated as:

$$\hat{x} = b + \sum_s p(s|b)r_s \quad \text{EQ. 8}$$

where $\hat{x}$ is the clean signal estimate in the cepstral domain, b is the alternative sensor feature vector, p(s|b) is determined using Equation 2 above, and $r_s$ is the correction vector for mixture component s. Thus, the estimate of the clean signal in Equation 8 is formed by adding the alternative sensor feature vector to a weighted sum of correction vectors where the weights are based on the probability of a mixture component given the alternative sensor feature vector.

At step 1210, the initial alternative sensor clean speech estimate is refined by combining it with a clean speech estimate that is formed from the noisy air conduction microphone vector and the noise model. This results in a refined clean speech estimate 1128. In order to combine the cepstral value of the initial clean signal estimate with the power spectrum feature vector of the noisy air conduction microphone, the cepstral value is converted to the power spectrum domain using:

$$\hat{S}_{x|b} = e^{C^{-1}\hat{x}} \quad \text{EQ. 9}$$

where $C^{-1}$ is an inverse discrete cosine transform and $\hat{S}_{x|b}$ is the power spectrum estimate of the clean signal based on the alternative sensor.

Once the initial clean signal estimate from the alternative sensor has been placed in the power spectrum domain, it can be combined with the noisy air conduction microphone vector and the noise model as:

$$\hat{S}_x = (\Sigma_n^{-1} + \Sigma_{x|b}^{-1})^{-1} [\Sigma_n^{-1}(S_y - \mu_n) + \Sigma_{x|b}^{-1}\hat{S}_{x|b}] \quad \text{EQ. 10}$$

where $\hat{S}_x$ is the refined clean signal estimate in the power spectrum domain, $S_y$ is the noisy air conduction microphone feature vector, $(\mu_n, \Sigma_n)$ are the mean and covariance of the prior noise model (see 1124), $\hat{S}_{x|b}$ is the initial clean signal estimate based on the alternative sensor, and $\Sigma_{x|b}$ is the covariance matrix of the conditional probability distribution for the clean speech given the alternative sensor's measurement. $\Sigma_{x|b}$ can be computed as follows. Let J denote the Jacobian of the function on the right hand side of Equation 9. Let $\Sigma$ be the covariance matrix of $\hat{x}$. Then the covariance of $\hat{S}_{x|b}$ is $$\Sigma_{x|b} = J\Sigma J^T \quad \text{EQ. 11}$$

In a simplified embodiment, EQ. 10 is rewritten as the following equation:

$$\hat{S}_x = \alpha(f)(S_y - \mu_n) + (1 - \alpha(f))\hat{S}_{x|b} \quad \text{EQ. 12}$$

where $\alpha(f)$ is a function of both the time and the frequency band. For example if the alternative sensor has a bandwidth up to 3 KHz, $\alpha(f)$ is chosen to be 0 for the frequency band below 3 KHz. Basically, the initial clean signal estimate from the alternative sensor is trusted for low frequency bands.

For high frequency bands, the initial clean signal estimate from the alterative sensor is not as reliable. Intuitively, when the noise is small for a frequency band at the current frame, a large $\alpha(f)$ is chosen so that more information is taken from the air conduction microphone for this frequency band. Otherwise, more information from the alternative sensor is used by choosing a small $\alpha(f)$. In one embodiment, the energy of the initial clean signal estimate from the alternative sensor is used to determine the noise level for each frequency band. Let $E(f)$ denote the energy for frequency band $f$. Let $M = \text{Max}_f E(f)$. $\alpha(f)$, as a function of $f$, is defined as follows:

$$\alpha(f) = \begin{cases} \dfrac{E(f)}{M} & : \quad f \geq 4k \\ \dfrac{f - 3K}{1K} & : \quad 3K < f < 4K \\ 0 & : \quad f \leq 3K \end{cases} \quad \text{EQ. 13}$$

where a linear interpolation is used to transition from 3K to 4K to ensure the smoothness of $\alpha(f)$.

Under one embodiment, the proximity of the mobile device to the user's head is incorporated into the determination of $\alpha(f)$. Specifically, if the proximity sensor 832 produces a maximum distance value D and a current distance value d, Equation 13 can be modified as:

$$\alpha(f) = \begin{cases} \beta\dfrac{E(f)}{M} + (1-\beta)\dfrac{d}{D} & : \quad f \geq 4K \\ \dfrac{f-3K}{1K}\alpha(4K) & : \quad 3K < f < 4K \\ 0 & : \quad f \leq 3K \end{cases} \quad \text{EQ. 14}$$

where $\beta$ is between zero and one and is selected based on which factor, energy or proximity, is believed to provide the best indication of whether the noise model for the air conduction microphone or the correction vector for the alternative sensor will provide the best estimate of the clean signal.

If $\beta$ is set to zero, $\alpha(f)$ is no longer frequency dependent and simply becomes:

$$\alpha = \frac{d}{D} \quad \text{EQ. 15}$$

The refined clean signal estimate in the power spectrum domain may be used to construct a Wiener filter to filter the noisy air conduction microphone signal. In particular, the Wiener filter, H, is set such that:

$$H = \frac{\hat{S}_x}{S_y} \quad \text{EQ. 16}$$

This filter can then be applied against the time domain noisy air conduction microphone signal to produce a noise-reduced or clean time-domain signal. The noise-reduced signal can be provided to a listener or applied to a speech recognizer.

Note that Equation 12 provides a refined clean signal estimate that is the weighted sum of two factors, one of which is a clean signal estimate from an alternative sensor. This weighted sum can be extended to include additional factors for additional alternative sensors. Thus, more than one alternate sensor may be used to generate independent estimates of the clean signal. These multiple estimates can then be combined using equation 12.

In one embodiment, the noise in the refined clean signal estimate is also estimated. Under one embodiment, this noise is treated as a zero mean Gaussian with a covariance that is determined as:

$$\Sigma_x = (\Sigma_n^{-1} + \Sigma_{x|b}^{-1})^{-1} = \Sigma_n \Sigma_{x|b}/(\Sigma_n + \Sigma_{x|b})$$

where $\Sigma_n$ is the variance of the noise in the air conduction microphone and $\Sigma_{x|b}$ is the variance of the noise in the estimate from the alternative sensor. In particular, $\Sigma_{x|b}$ is larger if the alternative sensor does not make good contact with the skin surface. How good the contact is can be measured by either using an additional proximity sensor or analyzing the alternative sensor. For the latter, observing that the alternative sensor produces little high-frequency response (larger than 4 KHz) if it is in good contact, we measure the contact quality with the ratio of low-frequency energy (less than 3 KHz) to high-frequency energy. The higher the ratio is, the better the contact makes.

Under some embodiments, the noise in the clean signal estimate is used to generate a side tone as discussed above in connection with FIG. 6. As the noise in the refined clean signal estimate increases, the volume of the side tone increases to encourage the user to place the alternative sensor in a better position so that the enhancement process improves. For example, the side tone encourages users to press the bone conduction sensor against their head so that the enhancement process is improved.

Noise Reduction Using Correction Vector without Noise Estimate

Figure 13:
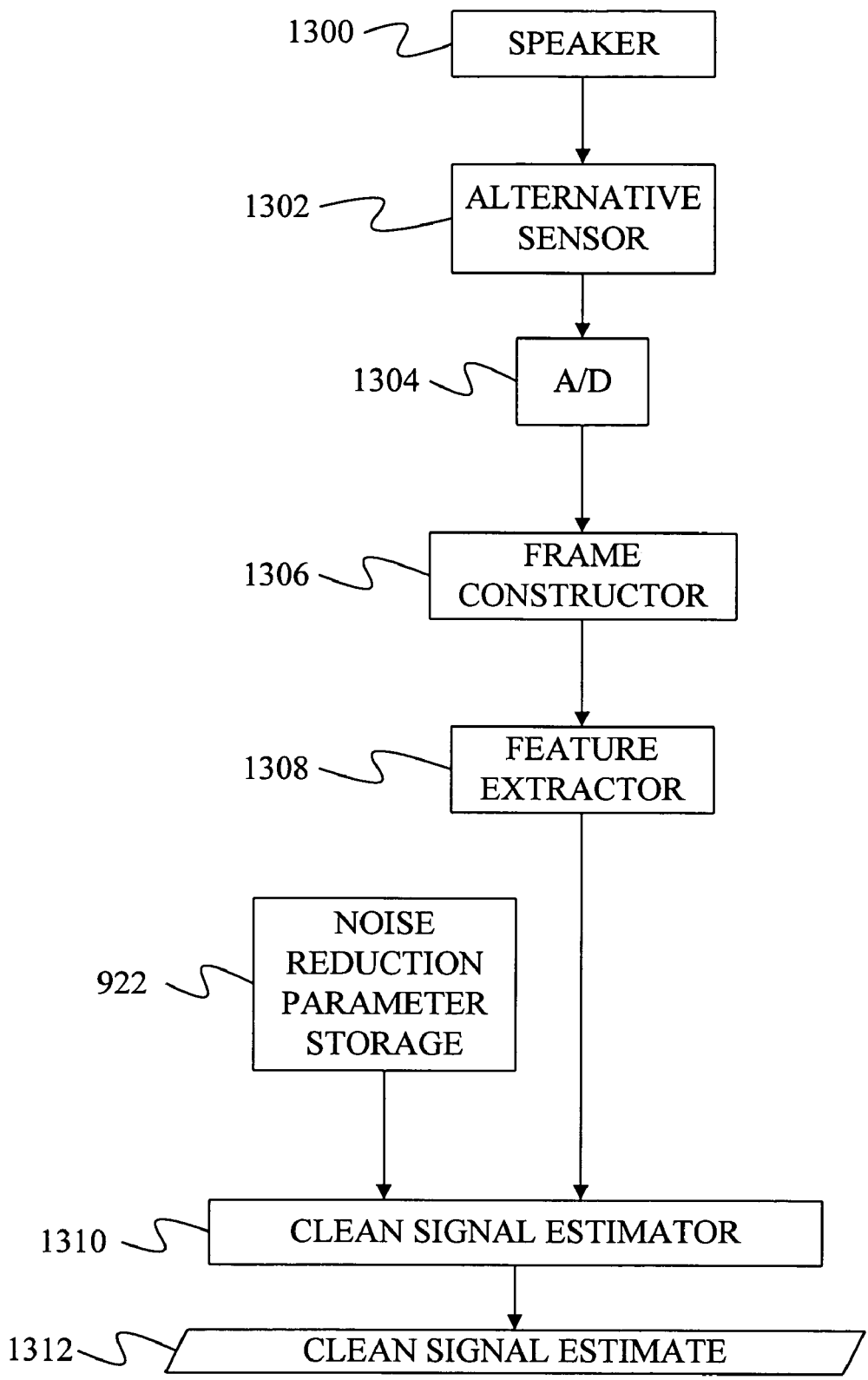
FIG. 13 is a block diagram of an alternative system for identifying an estimate of a clean speech signal.

FIG. 13 provides a block diagram of an alternative system for estimating a clean speech value under the present invention. The system of FIG. 13 is similar to the system of FIG. 11 except that the estimate of the clean speech value is formed without the need for an air conduction microphone or a noise model.

In FIG. 13, a physical event associated with a speaker 1300 producing speech is converted into a feature vector by alternative sensor 1302, analog-to-digital converter 1304, frame constructor 1306 and feature extractor 1308, in a manner similar to that discussed above for alternative sensor 1114, analog-to-digital converter 1116, frame constructor 1117 and feature extractor 1118 of FIG. 11. Note that although only one alternative sensor is shown in FIG. 13, additional alternative sensors may be used as in FIG. 11 with the addition of a compare and select unit as discussed above for FIG. 11.

The feature vectors from feature extractor 1308 and the noise reduction parameters 922 are provided to a clean signal estimator 1310, which determines an estimate of a clean signal value 1312, $\hat{S}_{x|b}$, using equations 8 and 9 above.

The clean signal estimate, $\hat{S}_{x|b}$, in the power spectrum domain may be used to construct a Wiener filter to filter a noisy air conduction microphone signal. In particular, the Wiener filter, H, is set such that:

$$H = \frac{\hat{S}_{x|b}}{S_y} \quad \text{EQ. 17}$$

This filter can then be applied against the time domain noisy air conduction microphone signal to produce a noise-reduced or clean signal. The noise-reduced signal can be provided to a listener or applied to a speech recognizer.

Alternatively, the clean signal estimate in the cepstral domain, $\hat{x}$, which is calculated in Equation 8, may be applied directly to a speech recognition system.

Noise Reduction Using Pitch Tracking

Figure 14:
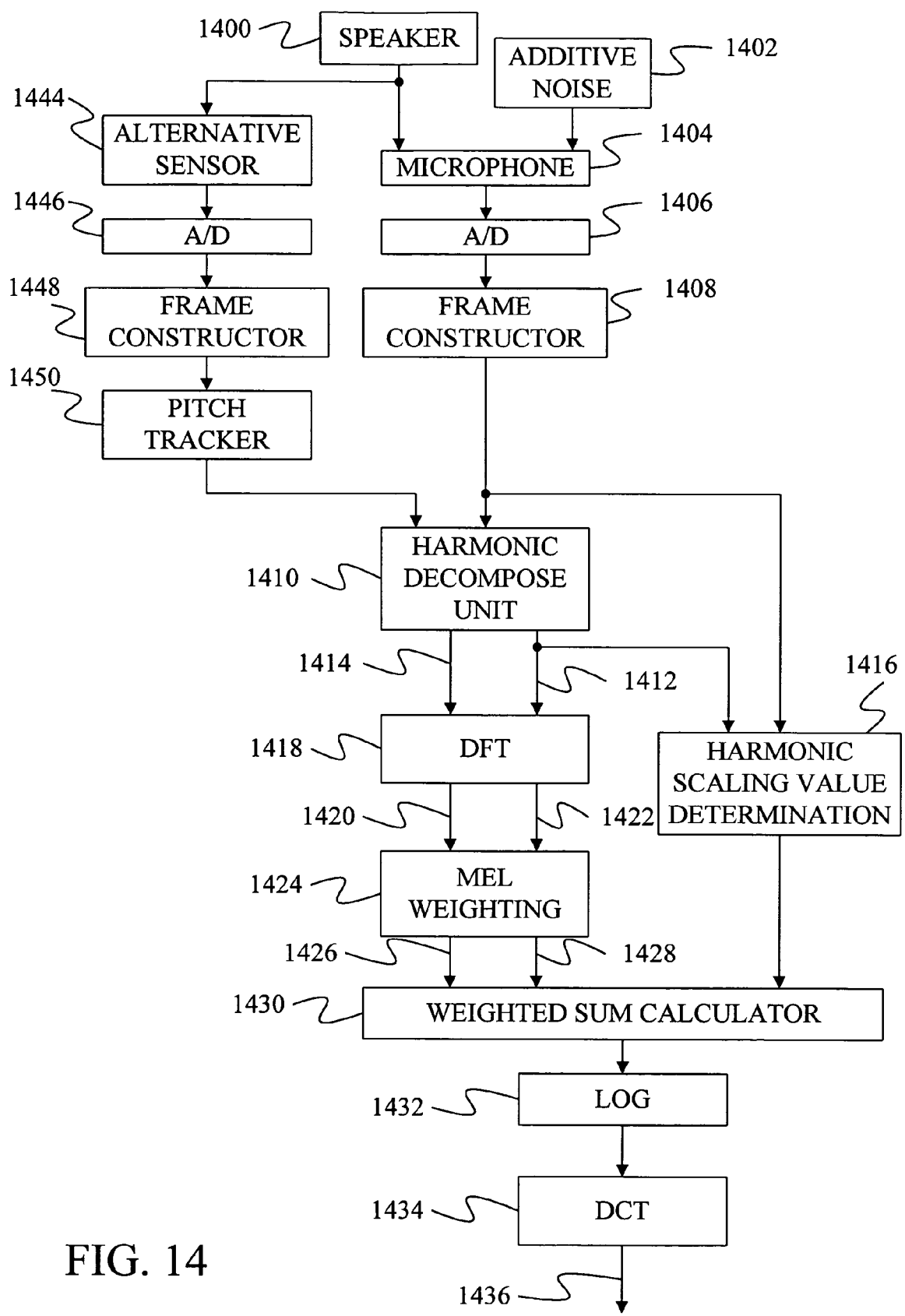
FIG. 14 is a block diagram of a second alternative system for identifying an estimate of a clean speech signal.
Figure 15:
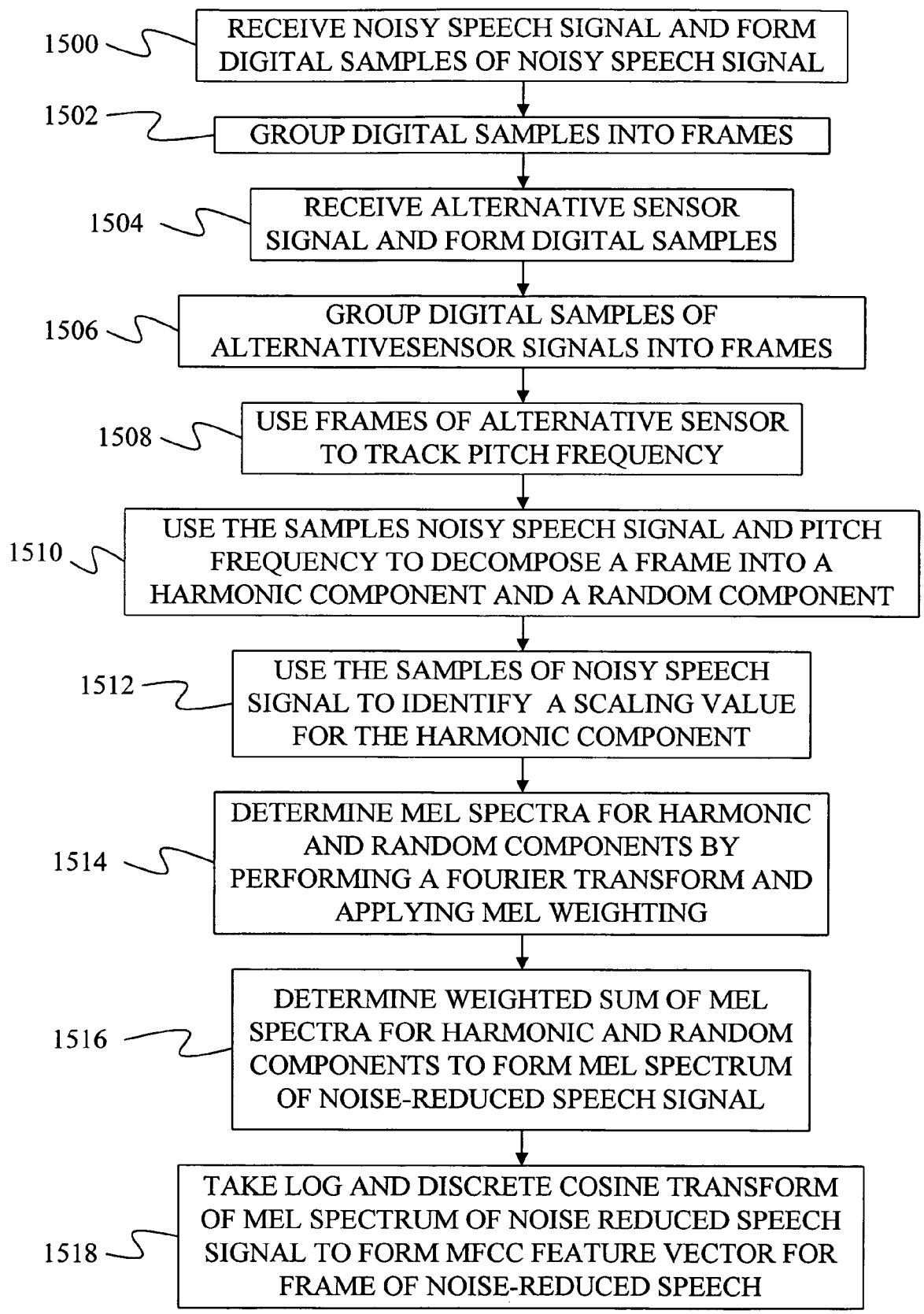
FIG. 15 is a flow diagram of a method for identifying an estimate of a clean speech signal using the system of FIG. 14.

An alternative technique for generating estimates of a clean speech signal is shown in the block diagram of FIG. 14 and the flow diagram of FIG. 15. In particular, the embodiment of FIGS. 14 and 15 determines a clean speech estimate by identifying a pitch for the speech signal using an alternative sensor and then using the pitch to decompose a noisy air conduction microphone signal into a harmonic component and a random component. Thus, the noisy signal is represented as:

$$y = y_h + y_r \quad \text{EQ. 18}$$

where y is the noisy signal, $y_h$ is the harmonic component, and $y_r$ is the random component. A weighted sum of the harmonic component and the random component are used to form a noise-reduced feature vector representing a noise-reduced speech signal.

Under one embodiment, the harmonic component is modeled as a sum of harmonically-related sinusoids such that:

$$y_k = \sum_{k=1}^{K} a_k \cos(k\omega_0 t) + b_k \sin(k\omega_0 t) \quad \text{EQ. 19}$$

where $\omega_0$ is the fundamental or pitch frequency and K is the total number of harmonics in the signal.

Thus, to identify the harmonic component, an estimate of the pitch frequency and the amplitude parameters $\{a_1 a_2 \ldots a_k b_1 b_2 \ldots b_k\}$ must be determined.

At step 1500, a noisy speech signal is collected and converted into digital samples. To do this, an air conduction microphone 1404 converts audio waves from a speaker 1400 and one or more additive noise sources 1402 into electrical signals. The electrical signals are then sampled by an analog-to-digital converter 1406 to generate a sequence of digital values. In one embodiment, A-to-D converter 1406 samples the analog signal at 16 kHz and 16 bits per sample, thereby creating 32 kilobytes of speech data per second. At step 1502, the digital samples are grouped into frames by a frame constructor 1408. Under one embodiment, frame constructor 1408 creates a new frame every 10 milliseconds that includes 25 milliseconds worth of data.

At step 1504, a physical event associated with the production of speech is detected by alternative sensor 1444. In this embodiment, an alternative sensor that is able to detect harmonic components, such as a bone conduction sensor, is best suited to be used as alternative sensor 1444. Note that although step 1504 is shown as being separate from step 1500, those skilled in the art will recognize that these steps may be performed at the same time. In addition, although only one alternative sensor is shown in FIG. 14, additional alternative sensors may be used as in FIG. 11 with the addition of a compare and select unit as discussed above for FIG. 11.

The analog signal generated by alternative sensor 1444 is converted into digital samples by an analog-to-digital converter 1446. The digital samples are then grouped into frames by a frame constructer 1448 at step 1506.

At step 1508, the frames of the alternative sensor signal are used by a pitch tracker 1450 to identify the pitch or fundamental frequency of the speech.

An estimate for the pitch frequency can be determined using any number of available pitch tracking systems. Under many of these systems, candidate pitches are used to identify possible spacing between the centers of segments of the alternative sensor signal. For each candidate pitch, a correlation is determined between successive segments of speech. In general, the candidate pitch that provides the best correlation will be the pitch frequency of the frame. In some systems, additional information is used to refine the pitch selection such as the energy of the signal and/or an expected pitch track.

Given an estimate of the pitch from pitch tracker 1450, the air conduction signal vector can be decomposed into a harmonic component and a random component at step 1510. To do so, equation 19 is rewritten as:

$$y = Ab \quad \text{EQ. 20}$$

where y is a vector of N samples of the noisy speech signal, A is an N×2K matrix given by:

$$A = [A_{cos} \, A_{sin}] \quad \text{EQ. 21}$$

with elements $$A_{cos}(k,t) = \cos(k\omega_0 t) \quad A_{sin}(k,t) = \sin(k\omega_0 t) \quad \text{EQ. 22}$$

and b is a 2K×1 vector given by:

$$b^T = [a_1 a_2 \ldots a_k b_1 b_2 \ldots b_k] \quad \text{EQ. 23}$$

Then, the least-squares solution for the amplitude coefficients is:

$$\hat{b} = (A^T A)^{-1} A^T y \quad \text{EQ. 24}$$

Using $\hat{b}$, an estimate for the harmonic component of the noisy speech signal can be determined as:

$$y_h = A\hat{b} \quad \text{EQ. 25}$$

An estimate of the random component is then calculated as:

$$y_r = y - y_h \quad \text{EQ. 26}$$

Thus, using equations 20-26 above, harmonic decompose unit 1410 is able to produce a vector of harmonic component samples 1412, $y_h$, and a vector of random component samples 1414, $y_r$.

After the samples of the frame have been decomposed into harmonic and random samples, a scaling parameter or weight is determined for the harmonic component at step 1512. This scaling parameter is used as part of a calculation of a noise-reduced speech signal as discussed further below. Under one embodiment, the scaling parameter is calculated as:

$$\alpha_h = \frac{\sum_i y_h(i)^2}{\sum_i y(i)^2} \quad \text{EQ. 27}$$

where $\alpha_h$ is the scaling parameter, $y_h(i)$ is the ith sample in the vector of harmonic component samples $y_h$ and $y(i)$ is the ith sample of the noisy speech signal for this frame. In Equation 27, the numerator is the sum of the energy of each sample of the harmonic component and the denominator is the sum of the energy of each sample of the noisy speech signal. Thus, the scaling parameter is the ratio of the harmonic energy of the frame to the total energy of the frame.

In alternative embodiments, the scaling parameter is set using a probabilistic voiced-unvoiced detection unit. Such units provide the probability that a particular frame of speech is voiced, meaning that the vocal cords resonate during the frame, rather than unvoiced. The probability that the frame is from a voiced region of speech can be used directly as the scaling parameter.

After the scaling parameter has been determined or while it is being determined, the Mel spectra for the vector of harmonic component samples and the vector of random component samples are determined at step 1514. This involves passing each vector of samples through a Discrete Fourier Transform (DFT) 1418 to produce a vector of harmonic component frequency values 1422 and a vector of random component frequency values 1420. The power spectra represented by the vectors of frequency values are then smoothed by a Mel weighting unit 1424 using a series of triangular weighting functions applied along the Mel scale. This results in a harmonic component Mel spectral vector 1428, $Y_h$, and a random component Mel spectral vector 1426, $Y_r$.

At step 1516, the Mel spectra for the harmonic component and the random component are combined as a weighted sum to form an estimate of a noise-reduced Mel spectrum. This step is performed by weighted sum calculator 1430 using the scaling factor determined above in the following equation:

$$\hat{X}(t) = \alpha_h(t) Y_h(t) + \alpha_r Y_r(t) \quad \text{EQ. 28}$$

where $\hat{X}(t)$ is the estimate of the noise-reduced Mel spectrum, $Y_h(t)$ is the harmonic component Mel spectrum, $Y_r(t)$ is the random component Mel spectrum, $\alpha_h(t)$ is the scaling factor determined above, $\alpha_r$ is a fixed scaling factor for the random component that in one embodiment is set equal to 0.1, and the time index t is used to emphasize that the scaling factor for the harmonic component is determined for each frame while the scaling factor for the random component remains fixed. Note that in other embodiments, the scaling factor for the random component may be determined for each frame.

After the noise-reduced Mel spectrum has been calculated at step 1516, the log 1432 of the Mel spectrum is determined and then is applied to a Discrete Cosine Transform 1434 at step 1518. This produces a Mel Frequency Cepstral Coefficient (MFCC) feature vector 1436 that represents a noise-reduced speech signal.

A separate noise-reduced MFCC feature vector is produced for each frame of the noisy signal. These feature vectors may be used for any desired purpose including speech enhancement and speech recognition. For speech enhancement, the MFCC feature vectors can be converted into the power spectrum domain and can be used with the noisy air conduction signal to form a Weiner filter.

Figure 16:
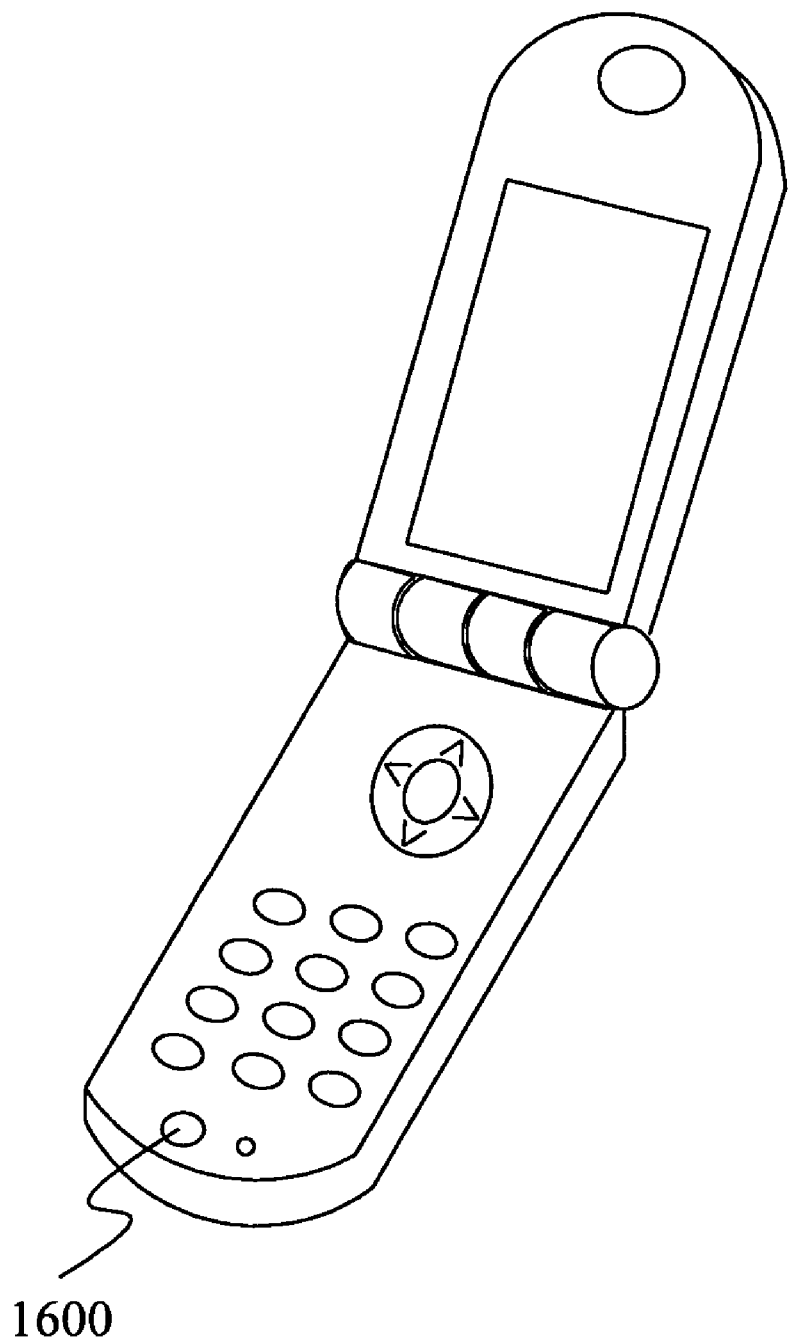
FIG. 16 is a perspective view of a further embodiment of a mobile device of the present invention.

Although the present invention has been discussed above with specific reference to using bone conduction sensors as the alternative sensors, other alternative sensors may be used. For example, in FIG. 16, a mobile device of the present invention utilizes an infrared sensor 1600 that is generally aimed at the user's face, notably the mouth region, and generates a signal indicative of a change in facial movement of the user that corresponds to speech. The signal generated by infrared sensor 1600 can be used as the alternative sensor signal in the techniques described above.

Although the present invention has been described with reference to particular embodiments, workers skilled in the art will recognize that changes may be made in form and detail without departing from the spirit and scope of the invention.

What is claimed is:

1. A mobile hand-held device comprising:
   an air conduction microphone that converts acoustic waves into an electric microphone signal indicative of a frame of speech;
   at least one alternative sensor other than an air conduction microphone that provides an electric alternative sensor signal indicative of the frame of speech based on contact between a user and at least one of at least two contact points coupled to the at least one alternative sensor wherein the two contact points are provided on opposite sides of a speaker in the hand-held device, wherein the at least one alternative sensor comprises a second alternative sensor that provides a second alternative sensor signal and wherein the alternative sensor and the second alternative sensor comprise bone conduction sensors; and
   a processor that uses the microphone signal and the alternative sensor signal to estimate a clean speech value for the frame of speech.

2. The mobile hand-held device of claim 1 wherein the mobile hand-held device has a left side and a right side opposite the left side and wherein the alternative sensor is located near the left side and the second alternative sensor is located near the right side.

3. The mobile hand-held device of claim 1 further comprising a selection unit that selects one of the alternative sensor signal and the second alternative sensor signal.

4. The mobile hand-held device of claim 3 wherein the selection unit selects one of the alternative sensor signal and the second alternative sensor signal based on the magnitudes of the alternative sensor signal and the second alternative sensor signal.

5. The mobile hand-held device of claim 1 wherein the speaker generates a sound based on the amount of noise in the clean speech value.

6. The mobile hand-held device of claim 1 further comprising a proximity sensor that produces a proximity signal indicative of the distance between the mobile hand-held device and an object.

7. The mobile hand-held device of claim 6 wherein the processor determines the clean speech value based on the microphone signal, the alternative sensor signal and the proximity signal.

8. The mobile hand-held device of claim 7 wherein the processor determines the clean speech value through a process comprising:
   determining a microphone contribution to the clean speech value based on the microphone signal;
   determining an alternative sensor contribution to the clean speech value based on the alternative sensor signal; and
   weighting the microphone contribution and the alternative sensor contribution based on the proximity signal.

9. The mobile hand-held device of claim 6 wherein the speaker generates a sound based on the proximity signal.

10. A mobile hand-held device comprising:
    an air conduction microphone that converts acoustic waves into an electric microphone signal indicative of a frame of speech;
    at least one alternative sensor other than an air conduction microphone that provides an electric alternative sensor signal indicative of the frame of speech based on contact between a user and at least one of at least two contact points coupled to the at least one alternative sensor wherein the two contact points are provided on opposite sides of a speaker in the hand-held device, wherein the at least one alternative sensor comprises a pressure transducer that is hydraulically coupled to a pad filled with a medium, wherein the mobile hand-held device has a left side and a right side opposite the left side and wherein the pad has a first portion on the left side and a second portion on the right side; and
    a processor that uses the microphone signal and the alternative sensor signal to estimate a clean speech value for the frame of speech.

11. The mobile hand-held device of claim 10 wherein the at least one alternative sensor further provides a proximity signal.

12. The mobile hand-held device of claim 11 wherein the proximity signal comprises a DC component of an electrical signal produced by the pressure transducer.

13. The mobile hand-held device of claim 12 wherein the alternative sensor signal comprises an AC component of the electrical signal produced by the pressure transducer.

14. A mobile device comprising:
    an air conduction microphone that converts acoustic waves into an electric microphone signal;
    an alternative sensor that provides an electric alternative sensor signal indicative of speech;
    a proximity sensor separate from the air conduction microphone that provides an electric proximity signal separate from the microphone signal that is indicative of the distance from the mobile device to an object; and
    a clean signal estimator that uses the microphone signal, the alternative signal and the proximity signal to remove noise from the microphone signal and thereby produce an enhanced clean speech signal.

15. The mobile device of claim 14 further comprising a speaker that produces a sound based on an estimate of the level of noise in the enhanced clean speech signal.

16. The mobile device of claim 14 wherein the mobile device produces the enhanced clean speech signal by using the proximity signal to weight a contribution to the enhanced clean speech signal that is formed from the alternative sensor signal.

17. The mobile device of claim 16 wherein weighting the contribution comprises giving the contribution less weight when the proximity signal indicates that the mobile device is far from the object.

18. The mobile device of claim 14 further comprising a speaker that produces a sound based on the proximity signal.

19. The mobile device of claim 18 wherein the volume of the sound increases as the proximity signal indicates that the distance between the mobile device and the object increases.

20. The mobile device of claim 14 wherein the alternative sensor signal and the proximity sensor signal are produced by a single sensor.

21. The mobile device of claim 20 wherein the single sensor comprises a pressure transducer that provides an electrical signal, the electrical signal having a DC component that represents the proximity signal and an AC component that represents the alternative sensor signal.

22. A method in a mobile device, the method comprising:
    receiving an air conduction microphone signal;
    receiving an alternative sensor signal that is indicative of speech;
    receiving a proximity sensor signal that indicates the distance between the mobile device and an object;
    estimating an enhanced clean speech value based on the air conduction microphone signal, the alternative sensor signal and the proximity sensor signal by weighting a contribution to the enhanced clean speech value that is derived from the alternative sensor signal based on the proximity sensor signal;
    estimating the noise in the enhanced clean speech value; and
    using the estimate of the noise to generate a sound through a speaker in the mobile device.

23. The method of claim 22 wherein the volume of the sound increases as the estimate of the noise increases.

24. The method of claim 22 wherein weighting a contribution comprises applying a greater weight to the contribution derived from the alternative sensor signal when the proximity sensor signal indicates that the mobile device is close to an object.

25. The method of claim 24 wherein the object is a user's head.

* * * * *